United States Patent
Kim et al.

(10) Patent No.: US 12,279,051 B2
(45) Date of Patent: Apr. 15, 2025

(54) IMAGE ACQUISITION APPARATUS PROVIDING WHITE BALANCE FUNCTION AND ELECTRONIC APPARATUS INCLUDING THE SAME

(71) Applicant: SAMSUNG ELECTRONICS CO., LTD., Suwon-si (KR)

(72) Inventors: Woo-Shik Kim, Yongin-si (KR); Inhwan Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 17/830,835

(22) Filed: Jun. 2, 2022

(65) Prior Publication Data
US 2023/0099629 A1 Mar. 30, 2023

(30) Foreign Application Priority Data
Sep. 28, 2021 (KR) .................. 10-2021-0128352

(51) Int. Cl.
*H04N 23/88* (2023.01)
*G06T 5/00* (2024.01)
*H04N 9/64* (2023.01)
*H04N 9/77* (2006.01)
*H04N 23/45* (2023.01)

(52) U.S. Cl.
CPC ............. *H04N 23/88* (2023.01); *G06T 5/00* (2013.01); *H04N 9/646* (2013.01); *H04N 9/77* (2013.01); *H04N 23/45* (2023.01); *G06T 2207/10024* (2013.01); *G06T 2207/20024* (2013.01)

(58) Field of Classification Search
None
See application file for complete search history.

(56) References Cited

U.S. PATENT DOCUMENTS

| 5,864,364 | A | 1/1999 | Ohyama et al. |
| 6,856,354 | B1 * | 2/2005 | Ohsawa ................. H04N 23/88 348/370 |
| 7,869,019 | B2 | 1/2011 | Ono |
| 8,106,978 | B2 | 1/2012 | Komiya et al. |
| 8,149,294 | B2 | 4/2012 | Komiya et al. |

(Continued)

FOREIGN PATENT DOCUMENTS

| CN | 105681679 A | 6/2016 |
| CN | 105898260 B | 1/2018 |

(Continued)

OTHER PUBLICATIONS

Maloney, Laurence T. et al., "Color constancy: a method for recovering surface spectral reflectance", Journal of the Optical Society of America A, vol. 3, No. 1, Jan. 1986, pp. 29-33. (6 pages total).

(Continued)

*Primary Examiner* — Quan Pham
(74) *Attorney, Agent, or Firm* — Sughrue Mion, PLLC

(57) ABSTRACT

Provided is an image acquisition apparatus including an image sensor configured to obtain an image, and a processor configured to obtain a basis based on a surrounding environment of the image acquisition apparatus, estimate illumination information based on the obtained basis, and perform color conversion on the image based on the estimated illumination information.

19 Claims, 28 Drawing Sheets

(56) References Cited

U.S. PATENT DOCUMENTS

| | | |
|---|---|---|
| 9,491,331 B2 | 11/2016 | Kaneko et al. |
| 2008/0143844 A1 | 6/2008 | Innocent |
| 2009/0295947 A1 | 12/2009 | Komiya et al. |
| 2011/0012997 A1* | 1/2011 | Koguchi .............. H04N 13/239 348/47 |
| 2011/0085063 A1* | 4/2011 | Min ....................... H04N 23/11 348/E5.091 |
| 2013/0016251 A1* | 1/2013 | Ogasahara ........... H04N 25/134 348/238 |
| 2013/0083216 A1* | 4/2013 | Jiang ..................... H04N 23/88 348/E9.051 |
| 2015/0281666 A1 | 10/2015 | Chen et al. |
| 2021/0195077 A1* | 6/2021 | Park ....................... H04N 23/56 |
| 2023/0175889 A1* | 6/2023 | Houck .................. G01J 3/2803 356/300 |

FOREIGN PATENT DOCUMENTS

| | | |
|---|---|---|
| CN | 107911683 B | 7/2019 |
| CN | 112866656 A | 5/2021 |
| DE | 10 2004 027 471 A1 | 12/2005 |
| JP | 2001-311666 A | 11/2001 |
| JP | 2005-303400 A | 10/2005 |
| JP | 2008-275582 A | 11/2008 |
| JP | 2009-260411 A | 11/2009 |
| JP | 2009-296102 A | 12/2009 |
| JP | 2014-116710 A | 6/2014 |
| WO | 2013/099644 A1 | 7/2013 |
| WO | 2021/037934 A1 | 3/2021 |

OTHER PUBLICATIONS

Communication issued Jan. 3, 2023 by the European Patent Office in counterpart European Patent Application No. 22186224.6.
Communication issued on Nov. 21, 2023 by the Japanese Patent Office for Japanese Patent Application No. 2022-138966.

* cited by examiner

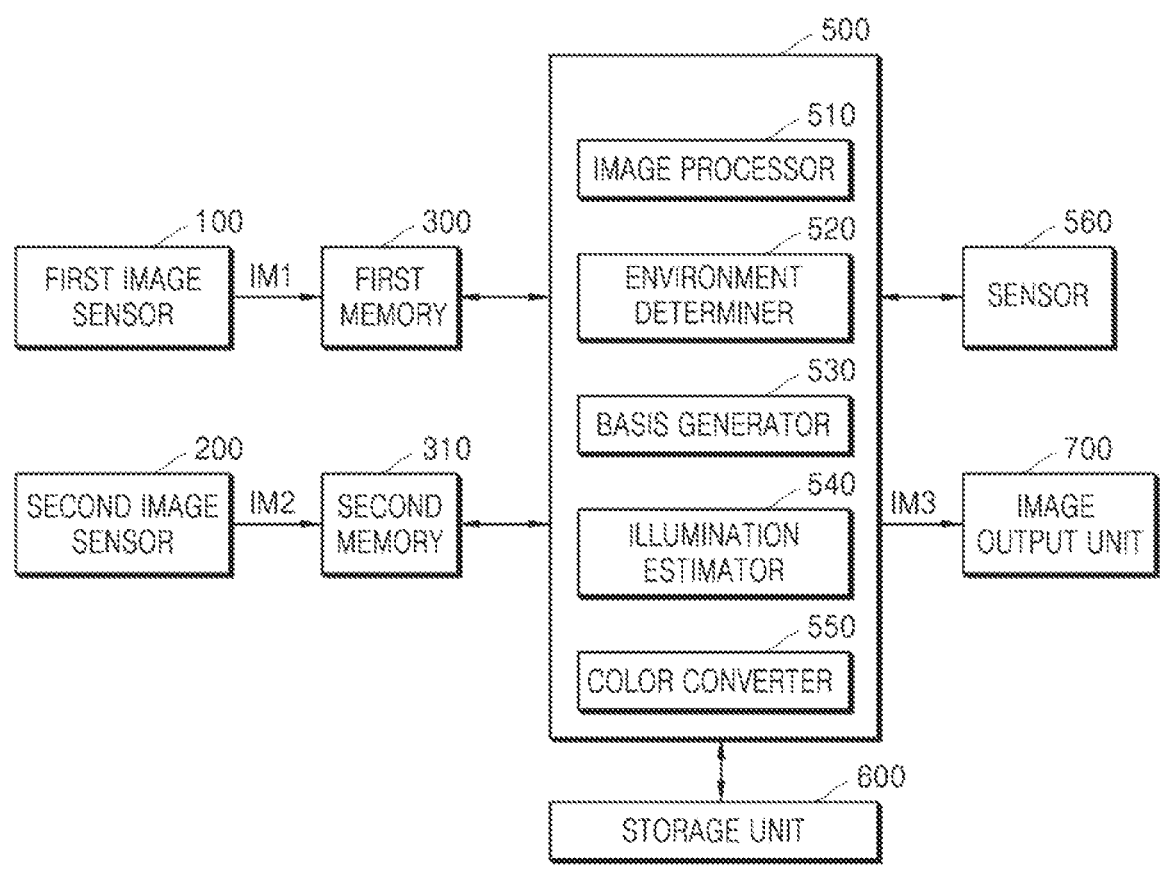

FIG. 10C

| F1 (UV1) | F6 (B1) | F11 (B4) | F16 (G4) | F21 (G6) |
| F2 (UV2) | F7 (B2) | F12 (B5) | F17 (G5) | F22 (G7) |
| F3 (UV3) | F8 (B3) | F13 (R2) | F18 (R5) | F23 (NIR2) |
| F4 (G1) | F9 (G3) | F14 (R3) | F19 (R6) | F24 (NIR3) |
| F5 (G2) | F10 (R1) | F15 (R4) | F20 (NIR1) | F25 (NIR4) |

223

IMAGE ACQUISITION APPARATUS PROVIDING WHITE BALANCE FUNCTION AND ELECTRONIC APPARATUS INCLUDING THE SAME

CROSS-REFERENCE TO RELATED APPLICATION

This application is based on and claims priority under 35 U.S.C. § 119 to Korean Patent Application No. 10-2021-0128352, filed on Sep. 28, 2021, in the Korean Intellectual Property Office, the disclosure of which is incorporated by reference herein in its entirety.

BACKGROUND

1. Field

Example embodiments of the present disclosure relate to an image acquisition apparatus providing white balance and an electronic apparatus including the same.

2. Description of Related Art

An image sensor is a device that receives light incident from an object, and photoelectrically converts the received light to generate an electrical signal.

The image sensor uses a color filter, which consists of an array of filter elements that selectively transmit red light, green light, and blue light for color expression, senses the amount of light that has passed through each filter element, and then forms a color image of the object through image processing.

Because a value sensed by the image sensor is affected by illumination, the color of an image captured by a camera is also affected by the illumination. White balance is a technique that eliminates these effects to capture the unique color of an object as much as possible.

In a white balance technique of the related art, white balance is performed by capturing an red-green-blue (RGB) image and analyzing information in the image. This method requires the Gray World assumption, that is, the assumption that an average value of each R, G, and B channel of the image is the same or requires other constraints, and thus the method may not work properly in a situation where such constraints are not satisfied.

SUMMARY

One or more example embodiments provide image acquisition apparatuses providing white balance and electronic apparatuses including the same.

Additional aspects will be set forth in part in the description which follows and, in part, will be apparent from the description, or may be learned by practice of example embodiments.

According to an aspect of an example embodiment, there is provided an image acquisition apparatus including an image sensor configured to obtain an image, and a processor configured to obtain a basis based on a surrounding environment of the image acquisition apparatus, estimate illumination information based on the obtained basis, and perform color conversion on the image based on the estimated illumination information.

The image acquisition apparatus may further include at least one sensor configured to sense environmental information of the surrounding environment, wherein the processor may be further configured to select the basis from a plurality of pre-stored basis sets based on the environmental information obtained from the at least one sensor.

The processor may periodically or aperiodically be configured to obtain the environmental information by the at least one sensor prior to obtaining the image by the image sensor.

The at least one sensor may include a GPS sensor, an IMU sensor, a barometer, a magnetometer, an illuminance sensor, a proximity sensor, a distance sensor, or a three-dimensional scanner.

The image sensor may be further configured to sense images of multiple wavelength bands.

The processor may be further configured to analyze the image obtained by the image sensor, extract the environmental information from the analyzed image, and select the basis from the plurality of pre-stored basis sets based on the extracted environmental information.

The image acquisition apparatus may further include a storage configured to store a plurality of basis sets including illumination and reflectance based on a wavelength, wherein the processor may be further configured to select a basis set corresponding to the obtained environmental information from among the plurality of pre-stored basis sets.

The processor may be further configured to estimate the illumination information by performing spectral decomposition on the obtained image based on the selected basis set.

The image sensor may include a first image sensor configured to obtain an image of a first wavelength band, and a second image sensor configured to obtain an image of a second wavelength band.

The first image sensor may include a first sensor layer in which a plurality of first sensing elements are provided, and a first pixel array having a color filter provided on the first sensor layer and including red filters, green filters, and blue filters that are alternately provided, and wherein the second image sensor may include a second sensor layer in which a plurality of second sensing elements are provided, and a second pixel array having a spectral filter in which a filter group including a plurality of unit filters having different transmission wavelength bands is repeatedly provided, the spectral filter being provided on the second sensor layer.

Each of the transmission wavelength bands of the plurality of unit filters may include visible light and is included in a wavelength band greater than a visible light band, and the filter group may include 16 unit filters provided in a 4×4 array.

The first pixel array and the second pixel array may be horizontally spaced apart from each other on a circuit board.

First circuit elements configured to process a signal from the first sensor layer and second circuit elements configured to process a signal from the second sensor layer may be provided on the circuit board.

The image acquisition apparatus may further include a timing controller configured to synchronize operations of the first circuit elements and the second circuit elements.

The image acquisition apparatus may further include a first memory configured to store data corresponding to the first image, and a second memory configured to store data corresponding to the second image.

The first memory and the second memory may be provided in the circuit board.

The image acquisition apparatus may further include a first imaging optical system configured to form an optical image of an object on the first image sensor and including one or more lenses, and a second imaging optical system configured to form an optical image of the object on the second image sensor and including one or more lenses.

The first imaging optical system and the second imaging optical system may have identical focal lengths and identical fields of views.

According to another aspect of an example embodiment, there is provided an electronic apparatus including an image acquisition apparatus, the image acquisition apparatus including an image sensor configured to obtain an image, and a processor configured to obtain a basis based on a surrounding environment, estimate illumination information based on the obtained basis, and perform color conversion on the image based on the estimated illumination information.

According to another aspect of an example embodiment, there is provided a control method of an image acquisition apparatus, the method including obtaining an image, obtaining a basis based on a surrounding environment of the image acquisition apparatus, estimating illumination information based on the obtained basis, and performing color conversion on the image based on the estimated illumination information.

The basis may be a data set used to estimate the illumination information.

The surrounding environment may be an environment in which the image acquisition apparatus is provided.

According to another aspect of an example embodiment, there is provided an image acquisition apparatus including an image sensor configured to obtain an image, a sensor configured to obtain environmental information of a surrounding environment of the image acquisition apparatus, and a processor configured to select a basis from a plurality of pre-stored basis sets based on the obtained environmental information, estimate illumination spectrum information based on the obtained basis, and perform color conversion on the image based on the estimated illumination spectrum information.

BRIEF DESCRIPTION OF THE DRAWINGS

The above and/or other aspects, features, and advantages of example embodiments will be more apparent from the following description taken in conjunction with the accompanying drawings, in which:

FIG. 3 is a detailed block diagram of an image acquisition apparatus according to another example embodiment;

FIGS. 10A, 10B, and 10C are views illustrating example pixel arrangements of a second image sensor provided in an image acquisition apparatus according to an example embodiment;

DETAILED DESCRIPTION

Figure 1:
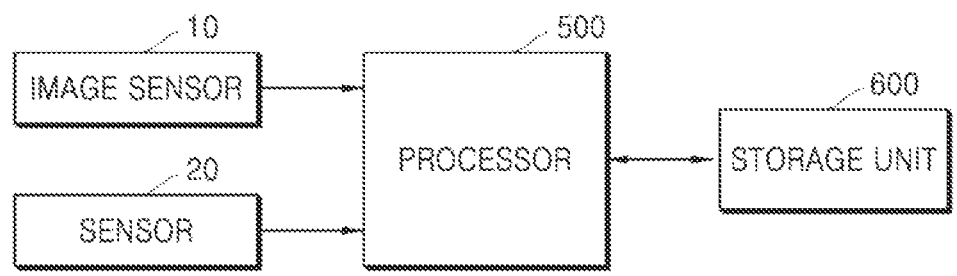
FIG. 1 is a block diagram of a schematic structure of an image acquisition apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The example embodiments described below are only examples, and thus, it should be understood that the example embodiments may be modified in various forms. The same reference numerals refer to the same elements throughout. In the drawings, the sizes of constituent elements may be exaggerated for clarity.

For example, when an element is referred to as being "on" or "above" another element, it may be directly on the other element, or intervening elements may also be present.

It will be understood that, although the terms "first", "second", etc. may be used herein to describe various elements, these elements should not be limited by these terms. These terms are used only to differentiate an element from another element. These terms do not limit the material or structure of the components.

As used herein, the singular forms "a," "an," and "the" are intended to include the plural forms as well, unless the context clearly indicates otherwise. In addition, it will be understood that when a unit is referred to as "comprising" another element, it may not exclude the other element but may further include the other element unless specifically oppositely indicates.

In addition, the terms "-er", "-or", and "module" described in the specification mean units for processing at least one function and/or operation and can be implemented by hardware components or software components and combinations thereof.

The use of the terms "a," "an," and "the" and similar referents is to be construed to cover both the singular and the plural.

Operations constituting a method may be performed in any suitable order unless explicitly stated that they should be performed in the order described. Further, the use of any and all examples, or exemplary language (e.g., "such as") provided herein, is intended merely to better illuminate the inventive concept and does not pose a limitation on the scope of the present disclosure unless otherwise claimed.

In general, a value sensed by a camera may be expressed as a product of illumination, an object color, and a camera response as shown in Equation 1 below.

$$\rho = \int E(\lambda) S(\mu) R(\lambda) d\lambda \quad \text{[Equation 1]}$$

Here, $\rho$ is the sensed value, and $E(\lambda)$, $S(\lambda)$, and $R(\lambda)$ are functions of spectrum $\lambda$ for illumination, object surface reflectance, and camera response, respectively. Because the sensed value is affected by illumination, the color of an image captured by a camera is also affected by the illumination. White balance eliminates these effects to capture the unique color of an object as much as possible.

There are two main methods of general white balance or auto white balance (AWB). General white balance is to directly estimate an illumination spectrum, and AWB is to estimate parameters related to illumination. In the AWB, in a scene where colors are evenly distributed, a Gray World algorithm using the assumption that the average of the colors of all scenes is an achromatic color may be used as an example. Next, using estimated illumination information, a k×n matrix T is computed to multiply the intensity of each pixel so that the entire scene to which an image belongs is placed under normative illumination. Where k is the number of channels and n is the number of pixels. By multiplying all pixels in the image by T, a white-balanced corrected image where each pixel is a k-tuple.

In the related methods such as Gray World and Max-RGB that perform white balance, when colors in all wavelength bands are not evenly distributed in a scene, a corrected image may produce a result as if it is under colored illumination rather than under normative illumination. In an example embodiment, this disadvantage of the related methods may be solved by estimating an illumination spectrum by using high color resolution of a multispectral sensor.

In an example embodiment, the illumination spectrum is estimated in a relatively small wavelength unit domain, for example, 5 nm or less, and a vector for color correction is estimated from the estimated value of the illumination spectrum.

Figure 4A:
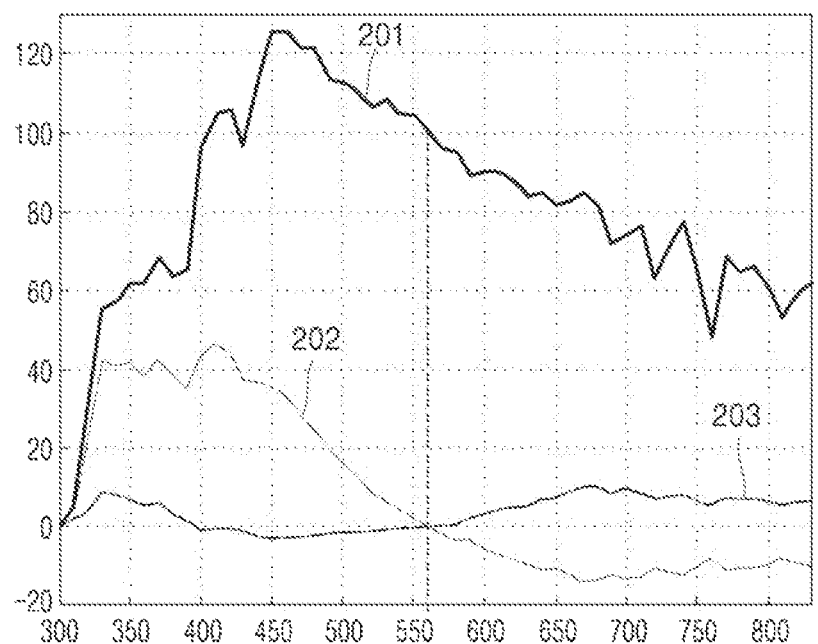
FIGS. 4A and 4B are example diagrams for explaining a basis set.

The white balance used by estimating the illumination spectrum according to related methods also has the following problems. When estimating the illumination spectrum, a basis (data basis) obtained by performing Principle Component Analysis (hereinafter referred to as PCA) from the spectra of known illuminations is used. It is based on the assumption that a linear combination of these bases may construct the actual spectrum of light. For example, in the case of the D illuminant series, which includes D65 illumination, which approximates a midday sunlight spectrum to 6500K, which is the temperature of a blackbody with a closest radiation spectrum, it is known that a linear combination of the three bases 201 to 203 as shown in FIG. 4A may approximate the distortion of the solar spectrum that can be caused by various influences such as cloudiness or fog. In FIG. 4A, the horizontal axis represents wavelengths of light and the vertical axis represents illumination.

Figure 4B:
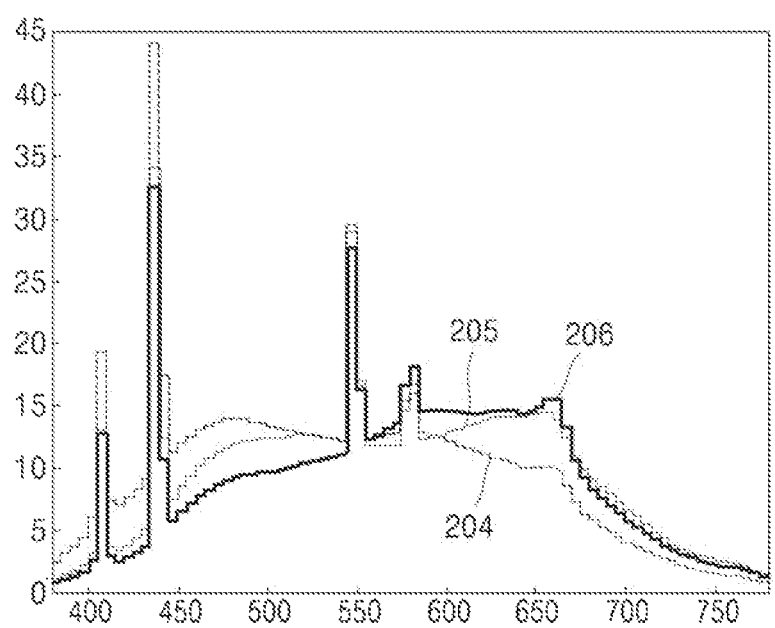

In addition, in the case of artificial illumination other than sunlight, a high peak may be included in a spectrum depending on characteristics of a fluorescent material applied for light emission. When calculating bases including artificial illumination such as F illuminant series, in the case of estimating a gentle and relatively flat illumination spectrum such as sunlight due to the influence of corresponding peaks, as shown in FIG. 4B, a combination of bases 204 to 206 may include peak values that should not exist. In FIG. 4B, the horizontal axis represents wavelengths of light and the vertical axis represents illumination.

In an example embodiment, in order to prevent this phenomenon, an illumination spectrum may be more accurately estimated by selecting an appropriate basis set according to the surrounding situation and estimating the illumination spectrum only within the selected basis set.

Referring to FIG. 1, an image acquisition apparatus includes an image sensor 10, a sensor 20, a processor 500, and a storage unit 600. The image acquisition apparatus according to an example embodiment obtains a basis that is a data set for estimating illumination information according to a surrounding environment in which the image acquisition apparatus is provided, estimates illumination information using the basis, and performs color conversion on an image by reflecting the estimated illumination information. The image acquisition apparatus according to an example embodiment performs white balance by using a method of directly estimating an illumination spectrum without using a Gray World algorithm. In addition, the image acquisition apparatus according to an example embodiment may more accurately estimate an illumination spectrum by selecting an appropriate basis set according to a surrounding situation and estimating an illumination spectrum only within the selected basis set.

The image sensor 10 is configured to obtain a certain image. The image sensor 10 may be a multispectral sensor that senses an image of a multiple wavelength band. The image sensor 10 may be plural, and may be one RGB sensor and another multispectral image (MSI) sensor. The configuration of a plurality of image sensors will be described later with reference to FIG. 3 and the like.

The sensor 20 is configured to sense environmental information around the image acquisition apparatus. The sensor 20 may be plural, and may include position and posture-related sensors such as, for example, a GPS, an IMU, a barometer, and a magnetometer. In addition, the sensor 20 may be an illuminance sensor, a proximity sensor, a distance sensor, a 3D scanner, or the like.

The sensor 20 may sense surrounding environmental information before obtaining an image through the image sensor 10. For example, when an image is not being captured by the image sensor 10, sensing by the sensor 20 may be performed periodically or aperiodically to track environmental information or variables, and changes thereof.

The processor 500 is configured to control an image acquisition operation of the image sensor 10 and a sensing operation of the sensor 20. The processor 500 obtains surrounding environmental information from the sensor 20. The processor 500 may select an appropriate basis set from among a plurality of basis sets based on the obtained environmental information. The processor 500 may estimate illumination information using the selected basis set, and perform color conversion on the image obtained from the image sensor 10 by reflecting the estimated illumination information.

In addition, the processor 500 may perform image processing on the image obtained from the image sensor 10. For example, the processor 500 may perform bad pixel correction, fixed pattern noise correction, crosstalk reduction, remosaicing, demosaicing, false color reduction, denoising, chromatic aberration correction, and the like. Here, it is described that the processor 500 performs image processing, but embodiments are not limited thereto, and it is understood that image processing may be performed through a separate image signal processor (hereinafter referred to as ISP).

The storage unit 600 is configured to store specific bases suitable for indicating illumination and reflectance. Bases representing illumination and reflectance may be different bases specialized for each. According to another example embodiment, a common basis for representing a general signal may be used together. The basis stored in the storage unit 600 may be stored by sampling a basis function value of a spectrum. According to another example embodiment, a basis function may be generated through an arithmetic operation. For example, basis functions used for Fourier Transform, Discrete Cosine Transform (DCT), Wavelet Transform, etc. may be determined and used.

The correspondence of a basis set to the environment may be preset. For example, the correspondence may be classified according to various environments, such as indoor and outdoor environments, close-up and long-distance capturing, complex scenes and monochromatic scenes, etc., and after defining and storing an optimal basis set for each environment, the basis set corresponding to each environment may be read and used.

In an example embodiment, the basis set may be specified through machine learning. For example, a machine learning method may use a shallow neural network. It is possible to set up a neural network with an input as an estimated environment label and an output as a label for each basis set calculated using PCA, and train the neural network with a pre-obtained ordered pair set of (environment labels and list of basis labels). In this case, the output may include consideration of the one-to-many correspondence in a network by using a tuple such as (0, 1, 1, 0, . . . 0) to express whether or not a specific basis is used by distinguishing between 0 and 1. By inputting an environmental label of a capturing time point of the image acquisition apparatus into the neural network and forwarding it once, a set of bases necessary for estimating illumination of a corresponding context may be estimated.

In an example embodiment, when determining a basis set for the environment, illumination and reflectance basis sets may be determined respectively. According to another example embodiment, for the environment, a basis set for illumination may be determined, and a basis set for reflectance may use a predefined fixed value.

The processor 500 may estimate an illumination spectrum through spectral decomposition using a basis or a basis set selected considering environmental information for an obtained image. Conversion required for white balance is made from the estimated light spectrum, and each pixel value of a captured image is converted using the conversion. In this case, after the conversion generates an RGB vector representing illumination from the illumination spectrum, white balance may be performed by dividing R, G, and B values of each pixel by the pixel values. According to another example embodiment, white balance may also be performed through linear conversion by generating a matrix for RGB conversion from the illumination spectrum. According to another example embodiment, a non-linear conversion method, such as a neural network that uses an illumination spectrum to convert RGB values, may be used.

Figure 2:
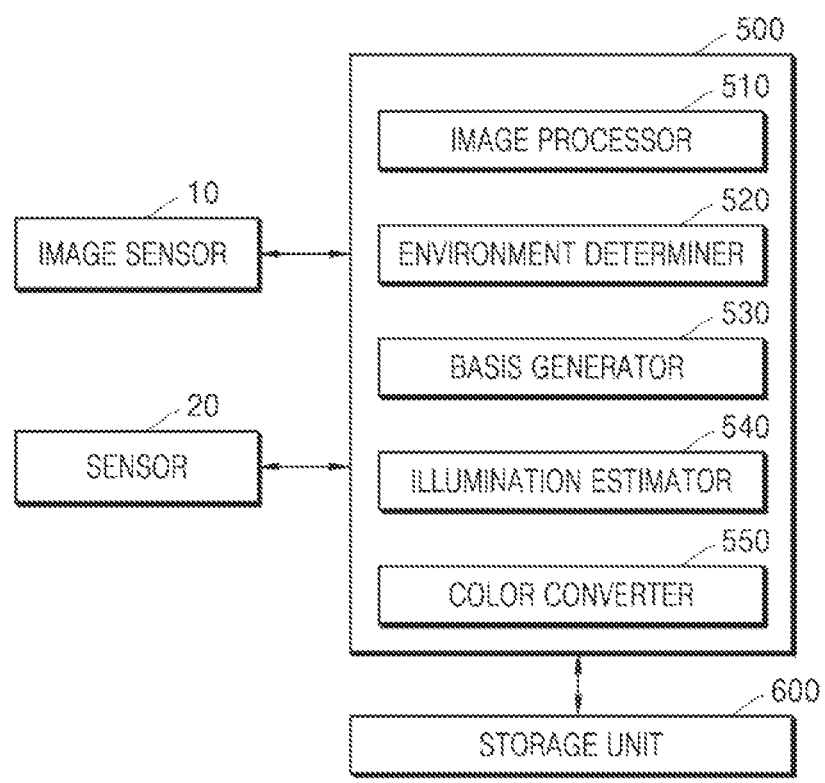
FIG. 2 is a detailed block diagram of a processor 500 shown in FIG. 1.

FIG. 2 is a detailed block diagram of the processor 500 shown in FIG. 1.

Referring to FIG. 2, the processor 500 includes an image processor 510, an environment determiner 520, a basis generator 530, an illumination estimator 540, and a color converter 550.

The image processor 510 performs image processing on an image obtained from the image sensor 10. For example, the image processing may include bad pixel correction, fixed pattern noise reduction, demosaicing, denoising, and the like.

The environment determiner 520 determines an environmental parameter to be used to determine an optimal basis set. To this end, various sensors including the image sensor 10 or the sensor 20 of the image acquisition apparatus obtain surrounding environment data before capturing. The various sensors may include an RGB image sensor and a multispectral image sensor. The various sensors may include position and posture-related sensors such as a GPS, an IMU, a barometer, and a magnetometer. The various sensors may also include sensors such as an illuminance sensor, a proximity sensor, a distance sensor, and a 3D scanner. In addition, the sensors may be periodically or aperiodically performed in advance when images are not being captured to track environmental variables and their changes.

The environment determiner 520 identifies environmental information including the environment under which the image acquisition apparatus is currently from the environmental information provided from the image sensor 10 or the sensor 20. The identified environmental information may be expressed as a predefined environmental parameter value. Environmental information or an environmental parameter may indicate whether a capturing location is indoors or outdoors. According to another example embodiment, the environmental information or the environmental parameter may indicate whether LED illumination of a specific band is used in an indoor illumination environment. In addition, the environmental information or the environmental parameter may include illuminance information. In addition, the environmental information or the environmental parameter may include information about a distance from an object. In addition, the environmental information or the environmental parameter may include information about the composition of an object within the angle of view. In addition, the environmental information or the environmental parameter may include information about user's location and posture.

In another example embodiment, the environment determiner 520 may analyze a captured image to calculate an environmental parameter. The captured image may be an image captured by an RGB image sensor or a multispectral image sensor, or both images may be used.

The basis generator 530 generates an appropriate basis from the environmental information or environmental parameters provided from the environment determiner 520. The basis generator 530 may generate specific bases suitable for representing illumination and reflectance in advance, respectively, and store the bases in the storage unit 600. Subsequently, a predefined value may be read from the storage unit 600 and used. In this case, bases representing illumination and reflectance may be different bases specialized for each. According to another example embodiment, a common basis for representing a general signal may be used together. The stored basis may be stored by sampling a basis function value of a spectrum. According to another example embodiment, a basis function may be generated through an arithmetic operation.

The correspondence of a basis set to the environment may be preset. For example, the correspondence may be classified according to various environments, such as indoor and outdoor environments, close-up and long-distance capturing, complex scenes and monochromatic scenes, etc. After defining and storing an optimal basis set for each environment, the basis set corresponding to each environment may be read and used. In addition, a basis set may be specified through machine learning. An example of a machine learning method that may be used is a shallow network. An input may be set as a determined environment label, and an output may be set as a label for each basis set calculated by using PCA, and they may be trained with an ordered pair set of a pre-obtained environment label and a list of basis labels. In this case, the output may include consideration of the one-to-many correspondence in a network by using a tuple such as (0, 1, 1, 0, . . . 0) to express whether a specific basis is used by distinguishing between 0 and 1. By inputting an environmental label of a capturing time point of the image acquisition apparatus into the neural network and forwarding it once, a set of bases necessary for estimating illumination of a corresponding context may be estimated.

When determining a basis set for the environment, illumination and reflectance basis sets may be determined respectively. According to another example embodiment, for the environment, a basis set for illumination is determined, and a basis set for reflectance may use a predefined fixed value.

The illumination estimator 540 estimates an illumination spectrum through spectral decomposition using a basis generated by the basis generator 530 with respect to an image input through the image sensor 10.

Illumination estimation is performed using spectrum information composed of a plurality of channels in the image. To this end, illumination and surface reflectance of an object may be expressed through spectral decomposition, illumination E may be expressed by the following Equation 2, and a color S of an object may be expressed by the following Equation 3.

$$E^x(\lambda) = \sum_{i=1}^{m} \epsilon_i^x E_i(\lambda)$$ [Equation 2]

$$S^x(\lambda) = \sum_{j=1}^{m} \sigma_j^x S_j(\lambda)$$ [Equation 3]

The product of these two represents a color, and a value sensed by a second image sensor 200 may be expressed as in Equation 4 below.

$$\rho_k^x = \int E^x(\lambda) S^x(\lambda) R_k(\lambda) d\lambda = \sum_{i=t}^{m} \sum_{j=1}^{n} \epsilon_i^x \sigma_j^x g_{ijk}$$ [Equation 4]

$$g_{ijk} \equiv \int E_i^x(\lambda) S_j^x(\lambda) R_k(\lambda) d\lambda$$

Here, m and n are the numbers of bases or basis vectors used when spectral decomposition of illumination and object color, respectively, x is a spatial position, and k is each channel index of a sensor. An illumination spectrum may be estimated by finding a solution to such a linear equation using a non-linear optimization technique or the like. In an example embodiment, by using a basis or a basis set generated by the basis generator 530 as m and n in Equation 4, it is possible to accurately estimate an illumination spectrum by reflecting an environmental change.

In addition, optionally, the illumination estimator 540 may perform illumination estimation using a neural network. A neural network is built by learning an image obtained for a preset illumination value, and illumination estimation is performed. After learning, a light value is obtained from an image obtained by an input of the neural network and an output.

The color converter 550 generates conversion required for white balance from an illumination spectrum estimated by the illumination estimator 540, and converts each pixel value of a captured image by using the conversion. In this case, after this conversion generates an RGB vector representing illumination from the illumination spectrum, white balance may be performed by dividing R, G, and B values of each pixel by the pixel values. According to another example embodiment, white balance may also be performed through linear conversion by generating a matrix for RGB conversion from the illumination spectrum. According to another example embodiment, a non-linear conversion method, such as a neural network that uses an illumination spectrum to convert RGB values, may be used.

FIG. 3 is a block diagram of a schematic structure of an image acquisition apparatus according to an example embodiment. An example embodiment of FIG. 3 implements the image sensor 10 shown in FIGS. 1 and 2 as two image sensors 100 and 200, wherein the first image sensor 100 is an RGB image sensor, and the second image sensor 200 is a multispectral image sensor. In an example embodiment, image data obtained from the multispectral image sensor is used when estimating an illumination spectrum, and the same configuration as in FIG. 2 will not be omitted.

Referring to FIG. 3, the image acquisition apparatus includes the first image sensor 100, the second image sensor 200, and the processor 500. The image acquisition apparatus according to an example embodiment more accurately performs white balance on an image captured by using a plurality of image sensors. The first image sensor 100 obtains a first image of a first wavelength band. A second wavelength band may include and be greater than the first wavelength band. The second image sensor 200 obtains a second image of the second wavelength band. The first image sensor 100 may be an RGB image sensor, and the second image sensor 200 may be an MSI sensor. The RGB image sensor has an R channel, a G channel and a B channel. The MSI sensor senses more wavelength bands of light by having more channels than the number of channels of the RGB image sensor.

The processor 500 matches the first image and the second image respectively output from the first image sensor 100 and the second image sensor 200, and performs color conversion on the matched image by using an illumination value estimated from the second image.

In addition, the processor 500 may divide the first image into one or more areas, may estimate each illumination value for each area of the second image corresponding to each divided area of the first image, and may perform color conversion on each divided area of the first image by using each illumination value estimated for each area of the second image.

In addition, when a difference between illumination values of adjacent areas from among the illumination values respectively estimated for the areas of the second image is equal to or greater than a first threshold value, the processor 500 may adjust any one of the illumination values of the adjacent areas so that the difference is less than the first threshold value. In this case, after performing color conversion, the processor 500 may perform post-processing on a boundary portion of the adjacent areas.

Referring again to FIG. 3, the image acquisition apparatus includes the first image sensor 100 obtaining a first image IM1 based on the first wavelength band, the second image sensor 200 obtaining a second image IM2 based on the second wavelength band, and the processor 500 that signal-processes the first image IM1 and the second image IM2 and generates a third image IM3. The third image IM3 is the first image obtained from the first image sensor 100, or an image on which white balance is performed on an image obtained by matching the first image obtained from the first image sensor 100 and the second image obtained from the second image sensor 200.

The first image sensor 100 is a sensor employed in a general RGB camera, and may be a complementary metal oxide semiconductor (CMOS) image sensor using a Bayer color filter array. The first image IM1 obtained by the first image sensor 100 may be an RGB image based on red, green, and blue.

The second image sensor 200 is a sensor that senses light of more wavelengths than the first image sensor 100. The second image sensor 200 may use, for example, 16 channels, or 31 channels, or another number of channels. A bandwidth of each channel is set less than the R, G, and B bands, and the total bandwidth including a bandwidth of all channels includes an RGB bandwidth, that is, a visible light bandwidth, and may be greater than the visible light bandwidth. For example, the total bandwidth may have a bandwidth of about 350 nm to about 1000 nm. The second image IM2 obtained by the second image sensor 200 may be a multi-spectral image or a hyperspectral image, may include a wavelength band that is greater than an RGB wavelength band, for example, a visible light band, and may be a wavelength-based image in which an ultraviolet to infrared wavelength band, which is greater than the visible light band, is divided into 16 or more channels. The second image IM2 may be an image obtained by using all available channels of the second image sensor 200, or may be an image obtained by selecting a specific channel. Spatial resolution of the second image IM2 may be lower than that of the first image IM1, but is not limited thereto.

In an example embodiment, the first image sensor 100 may be an RGB image sensor, and the second image sensor 200 may be an MSI sensor. In this case, the RGB sensor may be a CMOS image sensor. The RGB sensor may generate images of three channels by sensing spectra representing R, G, and B, respectively, using a Bayer color filter array. In addition, it is understood that the RGB sensor may use other types of color filter arrays. The MSI sensor senses and displays light of a wavelength different from that of the RGB sensor. The MSI sensor is characterized in that it senses more wavelengths of light by having more channels. In a specific example, the number of channels may be 16. In another example, 31 channels may be used. Each channel may adjust a light transmission band, a light transmission amount, and a bandwidth to sense light in a desired band. The total bandwidth composed of the sum of bandwidths of all channels includes the bandwidth of the existing RGB sensor and may be greater than that. Sensing spectra or wavelength bands of the RGB sensor and the MSI sensor will be described later with reference to FIGS. 7 to 10.

The first image sensor 100 and the second image sensor 200 may be configured as separate chips or as a single chip.

In an example embodiment, timing control may be performed according to different resolutions and output speeds between different types of sensors, and the size of an area required for image matching. For example, when one RGB image stream is read when the RGB sensor is operating, an image stream of the MSI sensor corresponding to the area may already be stored in a buffer or may need to be read again. Sensed signals may be read out by calculating the timing. According to another example embodiment, operations of the two sensors may be synchronized using an identical synchronization signal. In addition, focus control may be performed so that both the sensors are focused on an object at the same location.

In an example embodiment, when obtaining an image with the MSI sensor, images may be obtained for all channels, for example, 16 channels, or images may be obtained by selecting only a specific channel. Only some desired channels may be used by binning sensor pixels or by selecting or synthesizing a specific channel after image acquisition.

A first memory 300 stores the first image IM1 read out from the first image sensor 100. A second memory 310 stores the second image IM2 read out from the second image sensor 200.

In each sensor, images are read line by line and stored sequentially. The first memory 300 and the second memory 310 may be line memories for storing images in units of lines or frame buffers for storing the entire image.

In an example embodiment, when outputting images, only an RGB image may be output, and the RGB image may be stored in a frame buffer, an MSI image may be stored in a line buffer and processed line by line, and then the RGB image in the frame buffer may be updated. The memories 300 and 310 may use static random access memory (SRAM) or dynamic random access memory (DRAM), but the type of memories are not limited thereto.

Each of the memories 300 and 310 may be located external to a sensor, or may be integrated within the sensor. When integrated inside the sensor, the memory may be integrated with a sensor circuit. In this case, a pixel unit, and a circuit unit and the memory, which are other portions, may be configured as individual stacks and integrated into two stacks to form a single chip. According to another example embodiment, the memories 300 and 310 may be implemented as three stacks having three layers of a pixel unit, a circuit unit, and a memory.

In an example embodiment, it has been described that the first image and the second image obtained from the first image sensor and the second image sensor are stored in different memories, but embodiments are not limited thereto, and the first image and the second image may be stored in one memory.

In an example embodiment, the processor 500 separates illumination and color of an object using the MSI sensor to accurately perform white balance to find the exact color of the object, and then performs color conversion on an image obtained from the RGB sensor or a matched image using an illumination value to adjust white balance.

Figure 5:
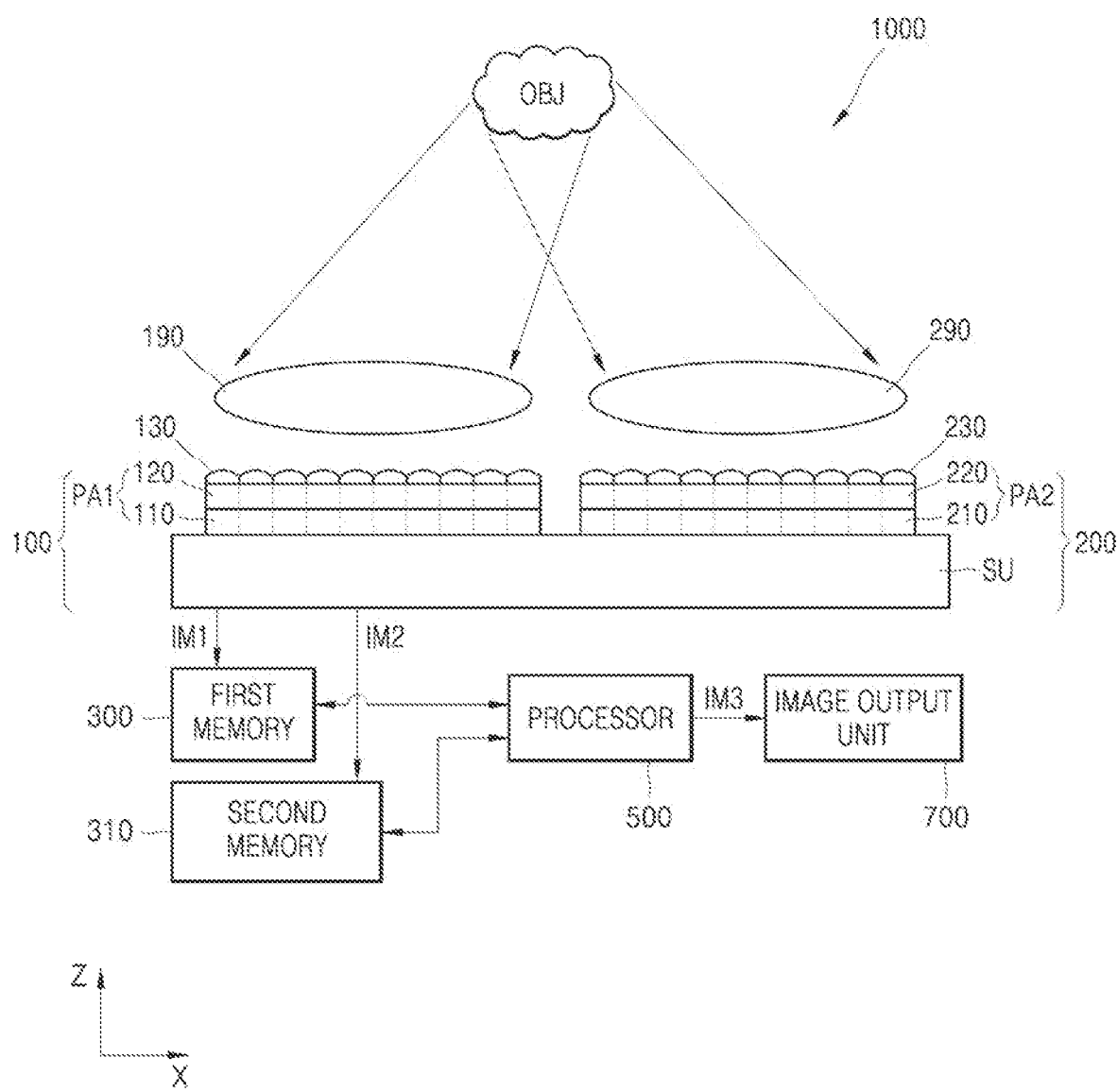
FIG. 5 is a conceptual diagram of a schematic structure of the image acquisition apparatus shown in FIG. 3.
Figure 6:
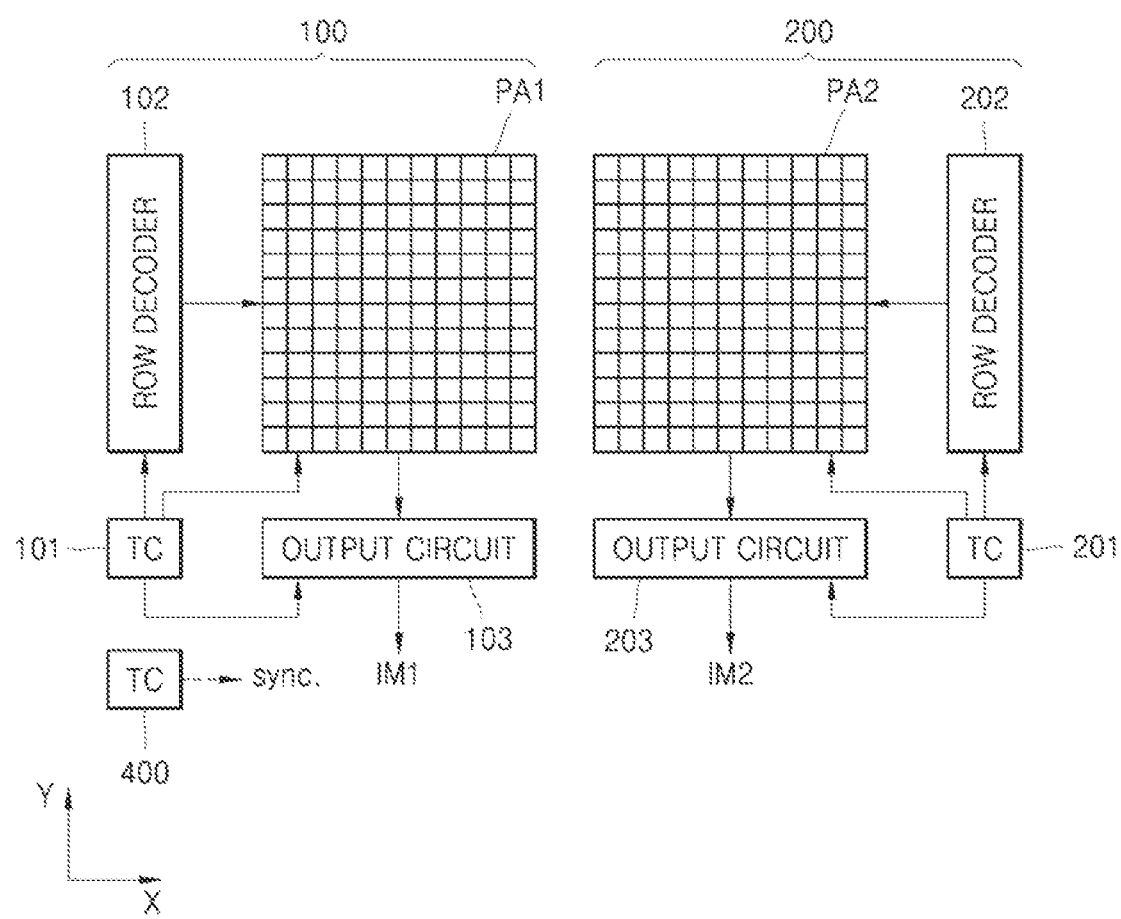
FIG. 6 is a view of circuit configurations of a first image sensor and a second image sensor provided in the image acquisition apparatus shown in FIG. 3.

FIG. 5 is a conceptual diagram of a schematic structure of an image acquisition apparatus according to an example embodiment, and FIG. 6 is a view of circuit configurations of a first image sensor and a second image sensor provided in an image acquisition apparatus according to an example embodiment.

An image acquisition apparatus 1000 includes the first image sensor 100 obtaining the first image IM1 based on a first wavelength band, the second image sensor 200 obtaining the second image IM2 based on a second wavelength band, and the processor 500 that signal-processes the first image IM1 and the second image IM2 and forms the third image IM3. The image acquisition apparatus 1000 may further include the first memory 300 storing data related to the first image IM1, the second memory 310 storing data related to the second image IM2, and an image output unit 700 outputting an image.

The image acquisition apparatus 1000 may further include a first imaging optical system 190 that forms an optical image of an object OBJ on the first image sensor 100 and a second imaging optical system 290 that forms an optical image of the object OBJ on the second image sensor 200. Although each of the first imaging optical system 190 and the second imaging optical system 290 is illustrated as including one lens, this is illustrative and embodiments are not limited thereto. The first imaging optical system 190 and the second imaging optical system 290 may be configured to have the same focal length and the same field of view. In this case, a process of registering the first image IM1 and the second image IM2 to form the third image IM3 may be more easier. However, embodiments are not limited thereto.

The first image sensor 100 includes a first pixel array PA1, and the first pixel array PA1 includes a first sensor layer 110 in which a plurality of first sensing elements are arrayed and a color filter 120 arranged on the first sensor layer 110. The color filter 120 may include red filters, green filters, and blue filters that are alternately arranged. A first micro lens array 130 may be on the first pixel array PA1. Various examples of a pixel arrangement applied to the first pixel array PA1 will be described with reference to FIG. 8.

The second image sensor includes a second pixel array PA2, and the second pixel array PA2 includes a second sensor layer 210 in which a plurality of second sensing elements are arrayed and a spectral filter 220 arranged on the second sensor layer 210. The spectral filter 220 includes a plurality of filter groups, and each of the plurality of filter groups may include a plurality of unit filters having different transmission wavelength bands. The spectral filter 220 may be configured to filter light in a wavelength band wider than that of the color filter 120 in a more subdivision than the color filter 120, the wavelength band, for example, being a wavelength band of an ultraviolet to infrared wavelength range. A second micro lens array 230 may be on the second pixel array PA2. An example of a pixel arrangement applied to the second pixel array PA2 will be described with reference to FIG. 10.

The first sensor layer 110 and the second sensor layer 210 may include a charge coupled device (CCD) sensor or a CMOS sensor, but embodiments are not limited thereto.

The first pixel array PA1 and the second pixel array PA2 may be horizontally arranged on, for example, a circuit board SU and spaced apart from each other in an X direction.

The circuit board SU may include first circuit elements for processing a signal from the first sensor layer 110 and second circuit elements for processing a signal from the second sensor layer 210. However, embodiments are not limited thereto, and the first circuit elements and the second circuit elements may be provided on separate substrates, respectively.

Although a memory in which data for the first image IM1 and the second image IM2 is stored is shown separately from the circuit board SU, this is only an example, and the memory may be arranged on the same layer as the circuit elements in the circuit board SU or as a separate layer. The memory may be a line memory that stores an image line by line, or a frame buffer that stores the entire image. The memory may be SRAM or DRAM.

Various circuit elements necessary for the image acquisition apparatus 1000 may be integrated and arranged on the circuit board SU. For example, a logic layer including various analog circuits and digital circuits may be provided, and a memory layer in which data is stored may be provided. The logic layer and the memory layer may be configured as different layers or the same layer.

Referring to FIG. 6, a row decoder 102, an output circuit 103, and a timing controller (TC) 101 are connected to the first pixel array PA1. The row decoder 102 selects one row of the first pixel array PA1 in response to a row address signal output from the timing controller 101. The output circuit 103 outputs a photo-sensing signal from a plurality of pixels arranged along a selected row in units of columns. To this end, the output circuit 103 may include a column decoder and an analog-to-digital converter (ADC). For example, the output circuit 103 may include a plurality of ADCs respectively arranged for each column between the column decoder and the first pixel array PA1, or one ADC arranged at an output terminal of the column decoder. The timing controller 101, the row decoder 102, and the output circuit 103 may be implemented as one chip or as separate chips. At least some of the illustrated circuit elements may be provided on the circuit board SU of FIG. 5. A processor for processing the first image IM1 output from the output circuit 103 may be implemented as a single chip together with the timing controller 101, the row decoder 102, and the output circuit 103.

A row decoder 202, an output circuit 203, and a timing controller (TC) 201 are also connected to the second pixel array PA2, and similar to the above, a signal from the second pixel array PA2 may be processed. In addition, a processor for processing the second image IM2 output from the output circuit 203 may be implemented as a single chip together with the timing controller 201, the row decoder 202, and the output circuit 203.

FIG. 6 illustrates that the first pixel array PA1 and the second pixel array PA2 have the same size and same number of pixels, however, embodiments are not limited thereto.

In operating two different types of sensors, timing control may be required according to different resolutions and output speeds, and the size of an area required for image matching. For example, when one image column is read based on the first image sensor 100, an image column of the second image sensor 200 corresponding to the area may already be stored in a buffer or may need to be read anew. According to another example embodiment, operations of the first image sensor 100 and the second image sensor 200 may be synchronized using the same synchronization signal. For example, a timing controller (TC) 400 may be further provided to transmit a synchronization signal sync. to the first image sensor 100 and the second image sensor 200.

Figure 7:
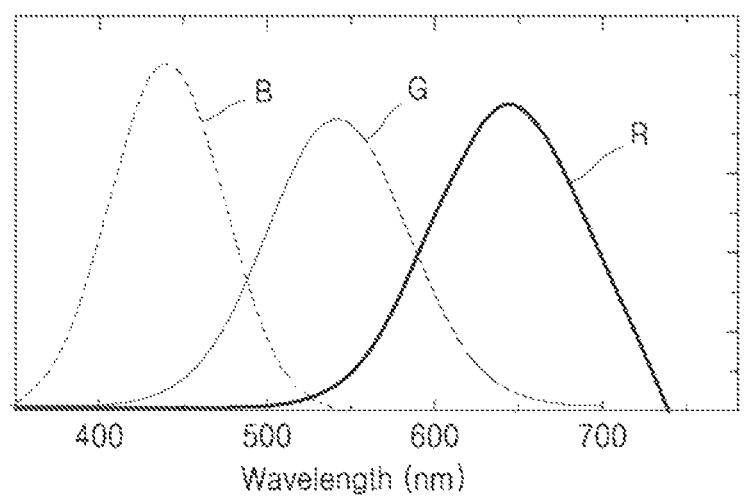
FIG. 7 is a view of a wavelength spectrum of a first image sensor provided in an image acquisition apparatus according to an example embodiment.
Figure 8A:
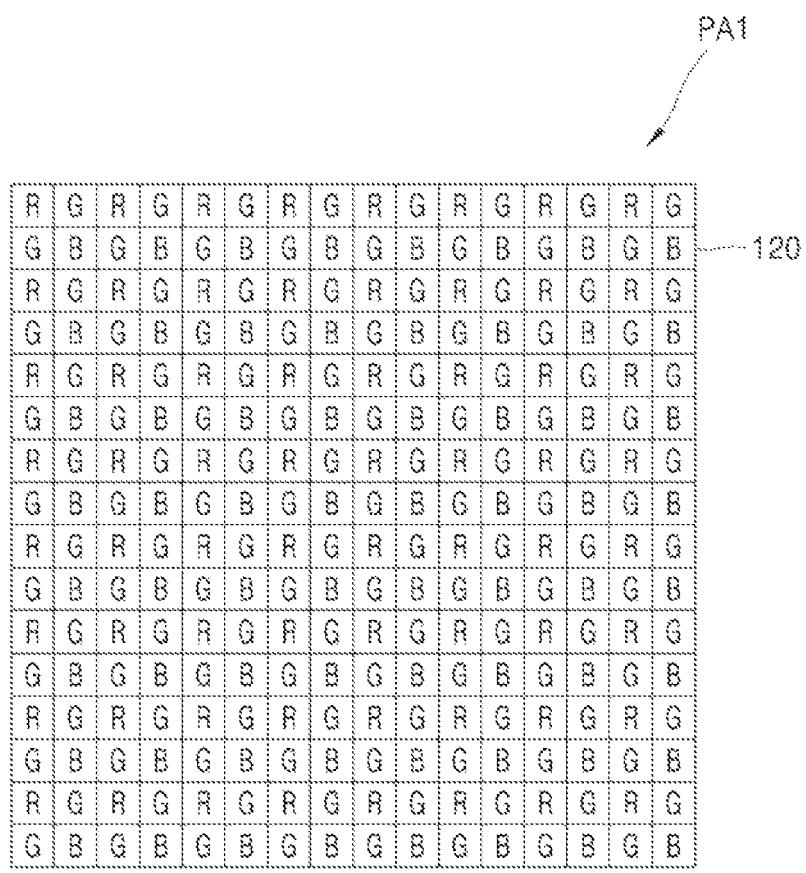
FIGS. 8A, 8B, and 8C are views illustrating example pixel arrangements of a first image sensor provided in an image acquisition apparatus according to an example embodiment.
Figure 8B:
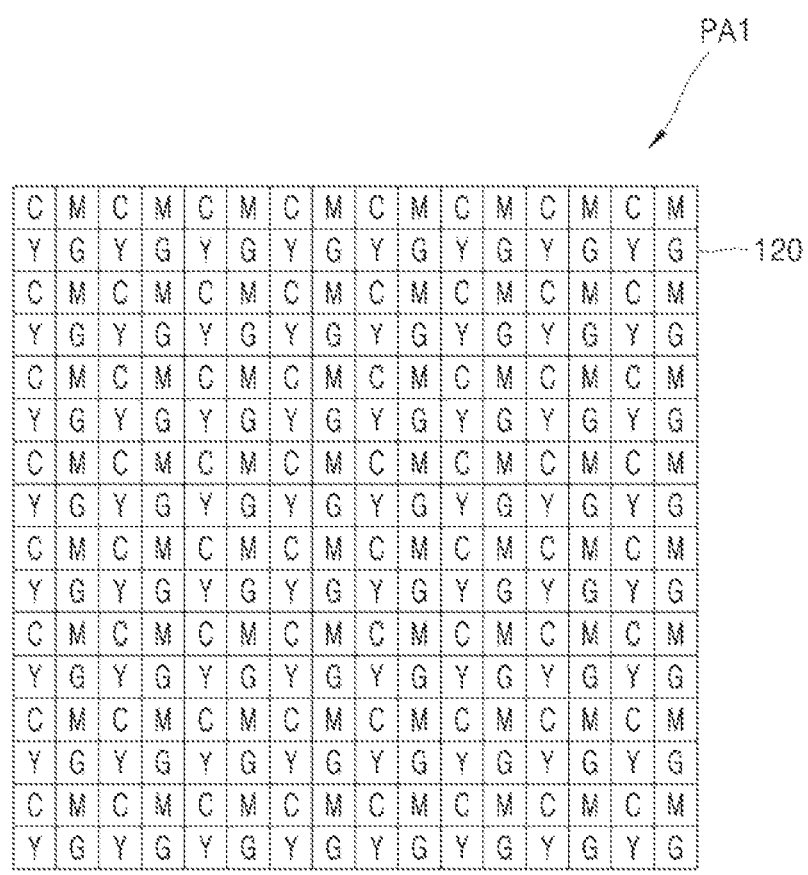
Figure 8C:
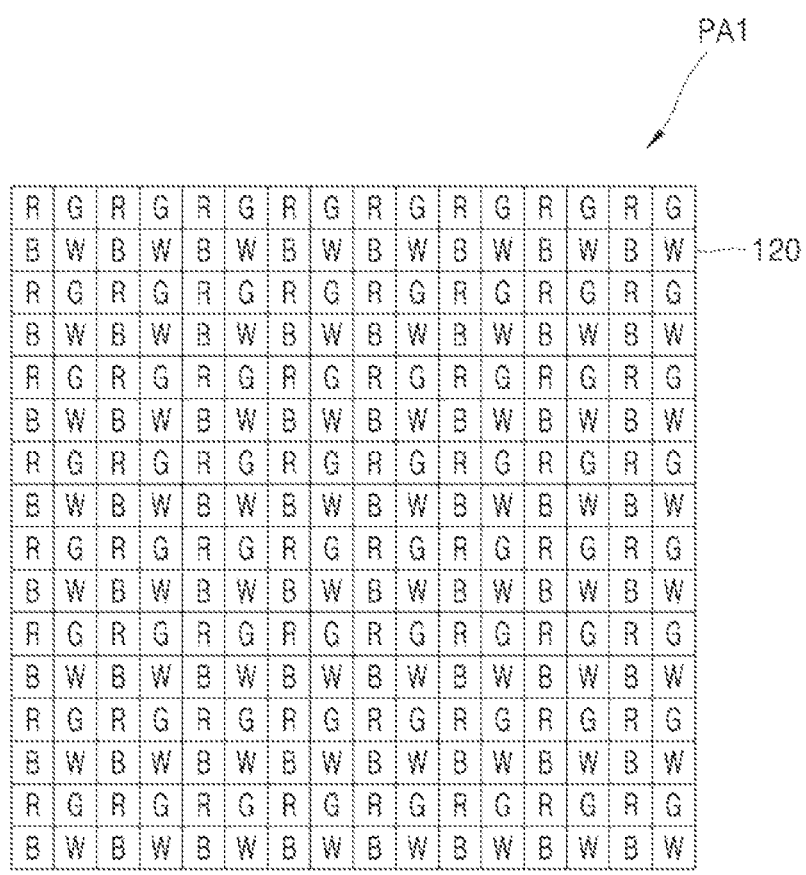

FIG. 7 is a view of a wavelength spectrum of a first image sensor provided in an image acquisition apparatus according to an example embodiment, and FIGS. 8A to 8C are views of exemplary pixel arrangements of a first image sensor provided in an image acquisition apparatus according to an example embodiment.

Referring to FIG. 8A, in the color filter 120 provided in the first pixel array PA1, filters for filtering red (R), green (G), and blue (B) wavelength bands are arranged in a Bayer pattern. For example, one unit pixel includes sub-pixels arranged in a 2×2 array, and a plurality of unit pixels are repeatedly arranged two-dimensionally. A red filter and a green filter are arranged in one row of a unit pixel, and a green filter and a blue filter are arranged in a second row. A pixel arrangement may be made in other ways than the Bayer pattern.

For example, referring to FIG. 8B, a CYGM arrangement in which a magenta pixel (M), a cyan pixel (C), a yellow pixel (Y), and a green pixel (G) constitute one unit pixel may also be made. In addition, referring to FIG. 8C, an RGBW arrangement in which a green pixel (G), a red pixel (R), a blue pixel (B), and a white pixel (W) constitute one unit pixel may also be made. Furthermore, the unit pixel may have a 3×2 array shape. Moreover, pixels of the first pixel array PA1 may be arranged in various ways according to color characteristics of the first image sensor 100.

Figure 9:
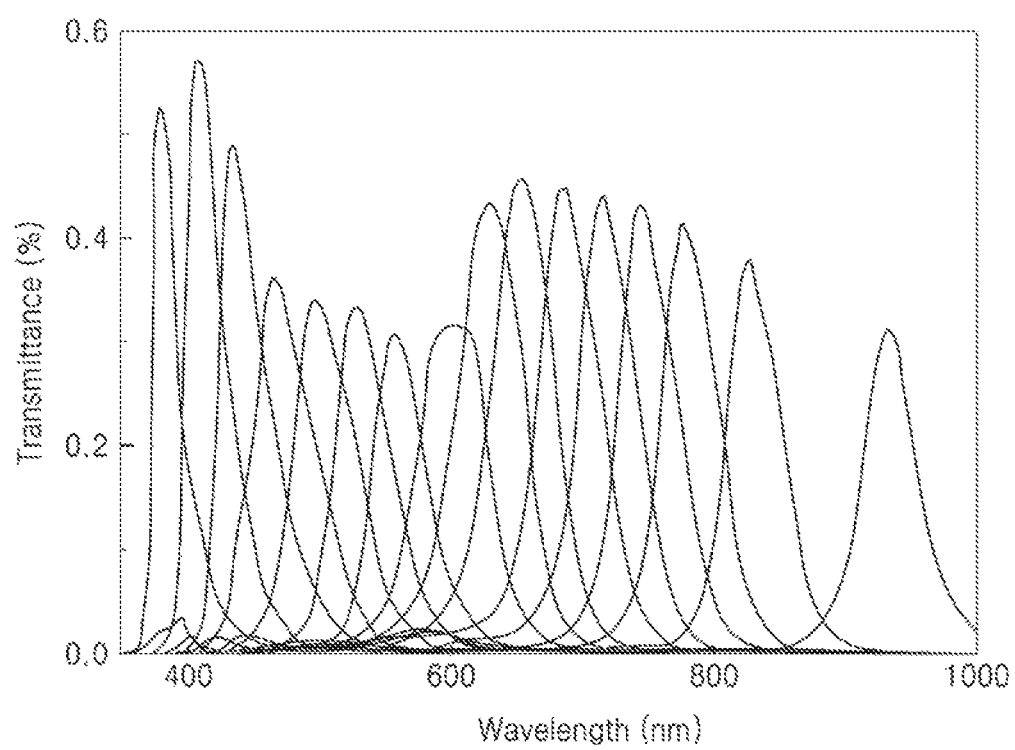
FIG. 9 is a view of a wavelength spectrum of a second image sensor provided in an image acquisition apparatus according to an example embodiment.
Figure 10A:
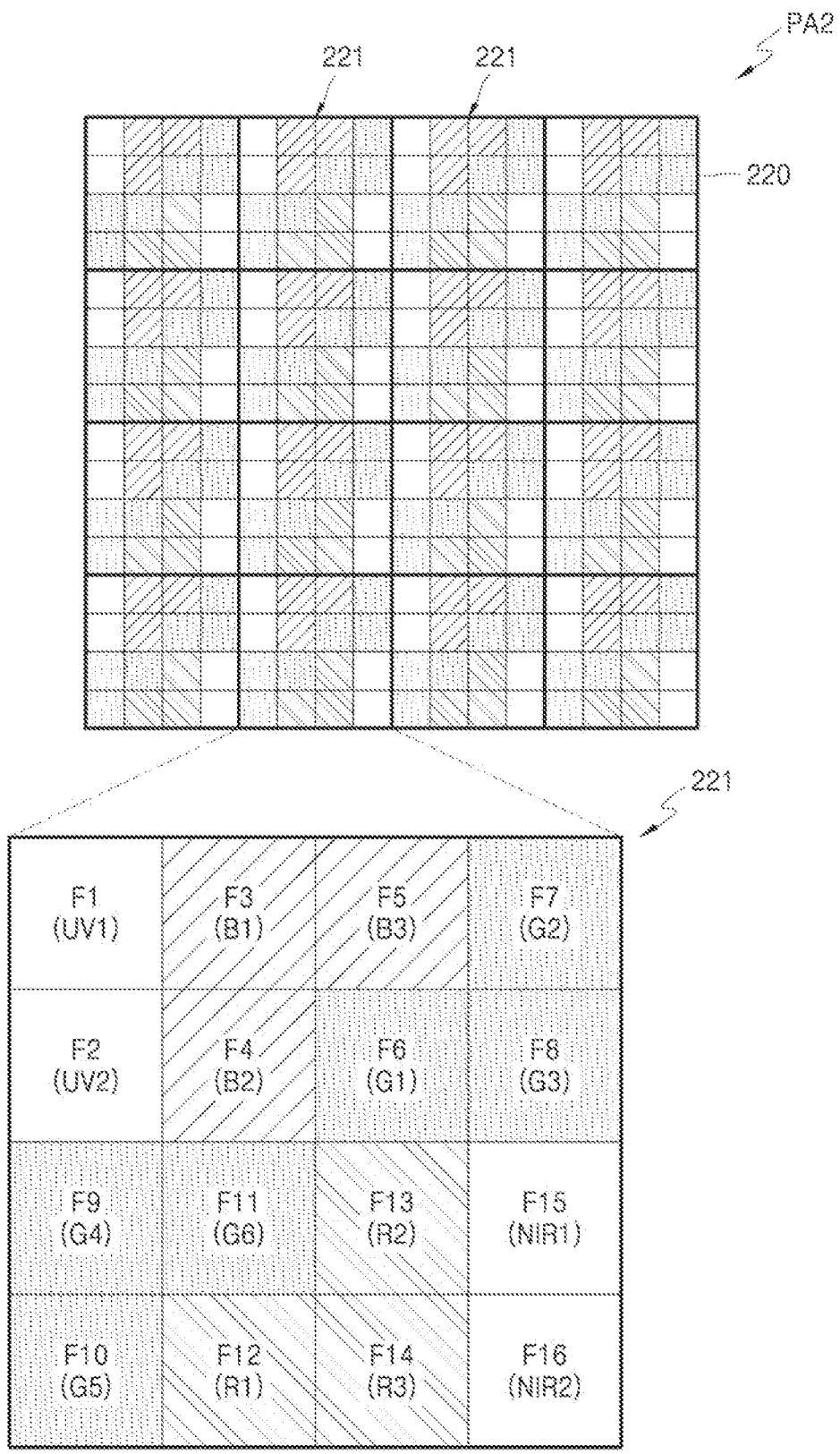
Figure 10B:
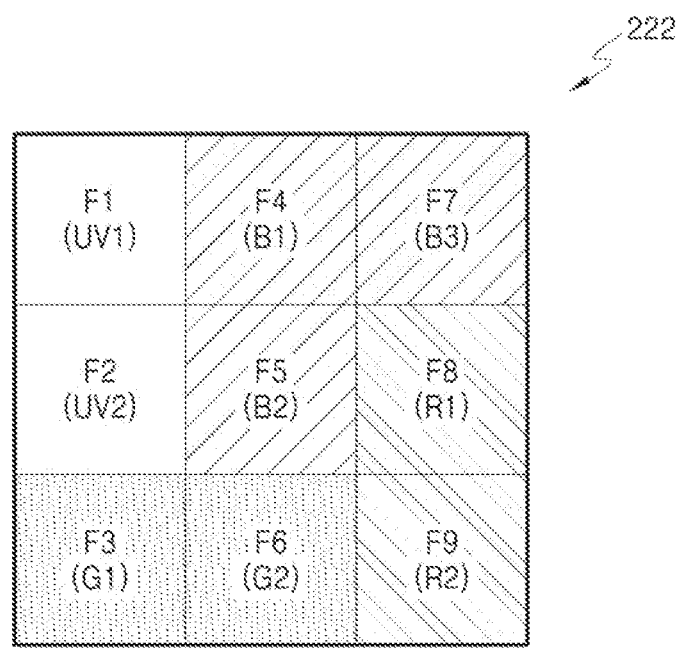

FIG. 9 is a view of a wavelength spectrum of a second image sensor provided in an image acquisition apparatus according to an example embodiment, and FIGS. 10A to 10C are views of exemplary pixel arrangements of a second image sensor provided in an image acquisition apparatus according to an example embodiment.

Referring to FIG. 10A, the spectral filter 220 provided in the second pixel array PA2 may include a plurality of filter groups 221 arranged in a two-dimensional form. Each filter group 221 may include 16 unit filters F1 to F16 arranged in a 4×4 array.

First and second unit filters F1 and F2 may have center wavelengths UV1 and UV2 in an ultraviolet area, and third to fifth unit filters F3 to F5 may have center wavelengths B1 to B3 of a blue light area. Sixth to eleventh unit filters F6 to F11 may have center wavelengths G1 to G6 of a green light area, and twelfth to fourteenth unit filters F12 to F14 may have center wavelengths R1 to R3 of a red light area. In addition, fifteenth and sixteenth unit filters F15 and F16 may have center wavelengths NIR1 and NIR2 in a near-infrared area.

FIG. 10B is a plan view of one filter group 222 of another example provided in the spectral filter 220. Referring to FIG. 10B, the filter group 222 may include nine unit filters F1 to F9 arranged in a 3×3 array. The first and second unit filters F1 and F2 may have the center wavelengths UV1 and UV2 in the ultraviolet area, and the fourth, fifth, and seventh unit filters F4, F5, and F7 may have the center wavelengths B1 to B3 of the blue light area. The third and sixth unit filters F3 and F6 may have the center wavelengths G1 and G2 of the green light area, and the eighth and ninth unit filters F8 and F9 may have the center wavelengths R1 and R2 of the red light area.

Figure 12:
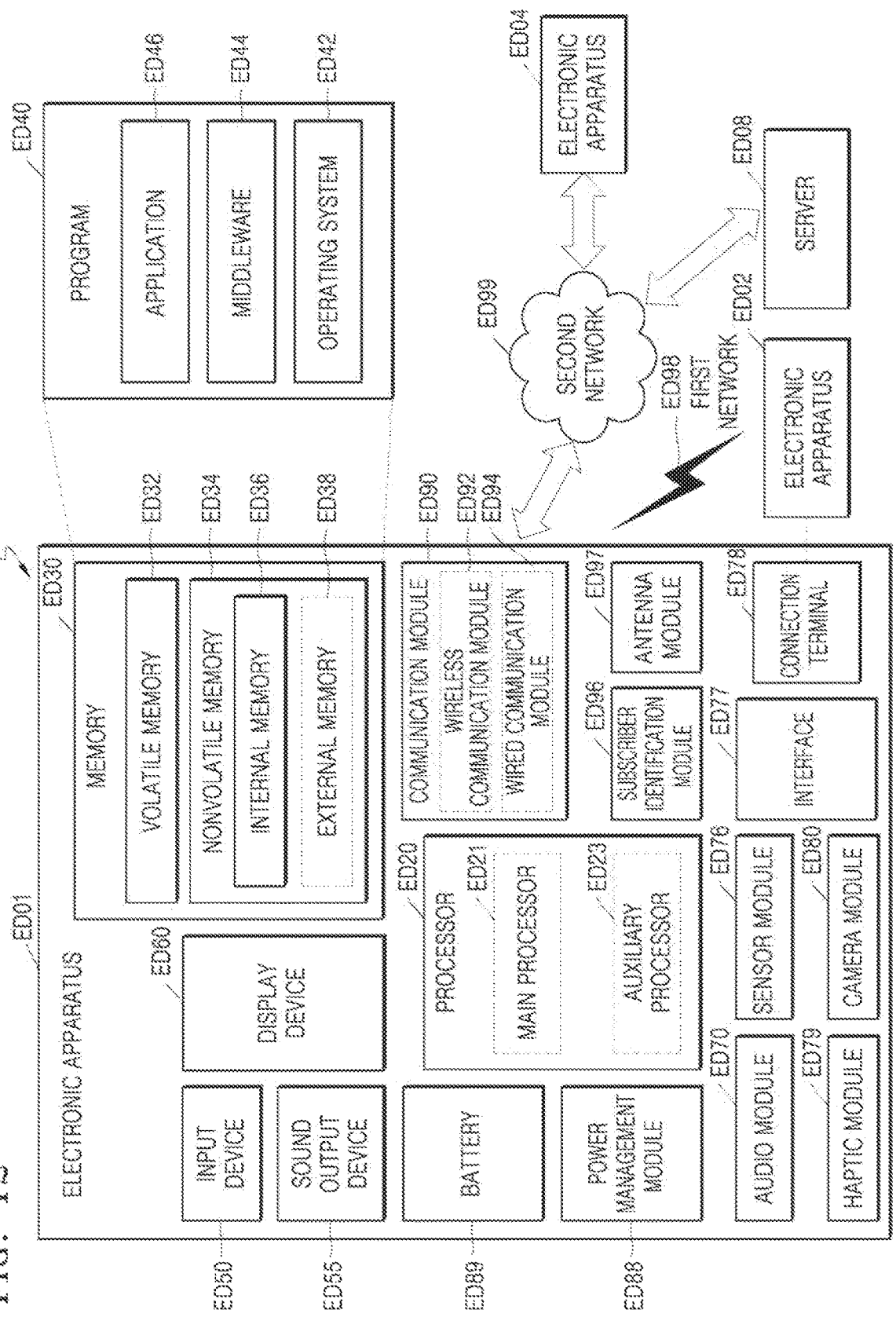
FIG. 12 is a block diagram of a schematic structure of an electronic apparatus according to an example embodiment.

FIG. 10C is a plan view of one filter group 223 of another example provided in the spectral filter 220. Referring to FIG. 12, the filter group 223 may include 25 unit filters F1 to F25 arranged in a 5×5 array. The first to third unit filters F1 to F3 may have center wavelengths UV1 to UV3 in the ultraviolet area, and the sixth, seventh, eighth, eleventh, and twelfth unit filters F6, F7, F8, F11, and F12 may have center wavelengths B1 to B5 of the blue light area. The fourth, fifth and ninth unit filters F4, F5, and F9 may have central wavelengths G1 to G3 of the green light area, and the tenth, thirteenth, fourteenth, fifteenth, eighteenth, and nineteenth unit filters F10, F13, F14, F15, F18, and F19 may have central wavelengths R1 to R6 of the red light area. In addition, the 20th, 23rd, 24th, and 25th unit filters F20, F23, F24, and F25 may have center wavelengths NIR1 to NIR4 in the near-infrared area.

The above-described unit filters provided in the spectral filter 220 may have a resonance structure having two reflection plates, and a transmitted wavelength band may be determined according to characteristics of the resonance structure. The transmission wavelength band may be adjusted according to a material of the reflection plate, a material of a dielectric material in a cavity, and a thickness of the cavity. In addition, a structure using a grating, a structure using a distributed Bragg reflector (DBR), etc. may be applied to a unit filter. Furthermore, pixels of the second pixel array PA2 may be arranged in various ways according to color characteristics of the second image sensor 200.

Figure 11:
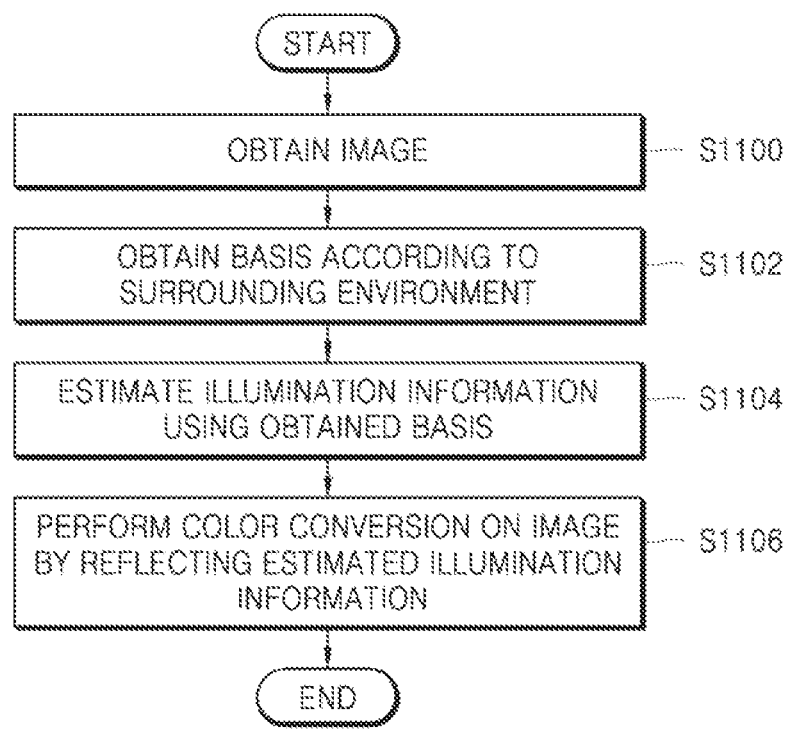
FIG. 11 is a flowchart illustrating a method of controlling an image acquisition apparatus according to another example embodiment.

FIG. 11 is a flowchart illustrating a method of controlling an image acquisition apparatus according to another example embodiment.

Referring to FIG. 11, in operation 1100, an image is obtained from an image sensor. The image sensor may be a multispectral image sensor.

In operation 1102, a basis is obtained according to a surrounding environment. A sensor for sensing the surrounding environment may include an image sensor including an RGB image sensor and a multispectral image sensor, position and posture-related sensors such as a GPS, an IMU, a barometer, and a magnetometer, an illuminance sensor, a proximity sensor, a distance sensor, a 3D scanner, and the like. The sensor for sensing the surrounding environment senses environmental information in advance before obtaining the image of operation 1100. In addition, the sensor for sensing the surrounding environment may track environmental information and changes in environmental information by periodically or aperiodically sensing before obtaining an image. The environmental information may be expressed as a predefined environmental parameter value. Environmental information or an environmental parameter may indicate whether a capturing location is indoors or outdoors. According to another example embodiment, the environmental information or the environmental parameter may indicate whether LED illumination of a specific band is used in an indoor illumination environment. In addition, the environmental information or the environmental parameter may include illuminance information. In addition, the environmental information or the environmental parameter may include information about a distance from an object. In addition, the environmental information or the environmental parameter may include information about the composition of an object within the angle of view. In addition, the environmental information or the environmental parameter may include information about user's location and posture.

In operation 1104, illumination information is estimated using the obtained basis. A method of estimating the illumination information using the basis has been described with reference to Equations 1 to 4 above. In an example embodiment, the method defined in Equations 1 to 4 is used, but embodiments are not limited thereto, and various numerical methods for estimating illumination information or illumination spectrum may be used.

In operation 1106, color conversion is performed on the image by reflecting the estimated illumination information.

A method of controlling an image acquisition apparatus according to an example embodiment may include obtaining a certain image, obtaining a basis according to a surrounding environment, estimating illumination information using the obtained basis, and performing color conversion on the image by reflecting the estimated illumination information, thereby more accurately estimating illumination in various situations, and maintaining color homeostasis by performing accurate white balance.

The image acquisition apparatus 1000 described above may be employed in various high-performance optical devices or high-performance electronic apparatuses. The electronic apparatus may be, for example, a smartphone, a mobile phone, a cell phone, a personal digital assistant (PDA), a laptop, a personal computer (PC), various portable devices, home appliances, a security camera, a medical camera, an automobile, an Internet of Things (IoT) device, or another mobile or non-mobile computing device, but is not limited thereto.

In addition to the image acquisition apparatus 1000, the electronic apparatus may further include a processor for controlling image sensors provided therein, for example, an application processor (AP), may control a plurality of hardware or software components by driving an operating system or an application program through a processor, and may perform various data processing and operations. The processor may further include a graphics-processing unit (GPU) and/or an image signal processor. When the processor includes an image signal processor, an image (or video) obtained by the image sensor may be stored and/or output using the processor.

FIG. 12 is a block diagram of a schematic structure of an electronic apparatus according to an example embodiment. Referring to FIG. 12, in a network environment ED00, an electronic apparatus ED01 may communicate with another electronic apparatus ED02 through a first network ED98 (a near-field wireless communication network, etc.) or may communicate with another electronic apparatus ED04 and/or a server ED08 through a second network ED99 (a far-field wireless communication network, etc.). The electronic apparatus ED01 may communicate with the electronic apparatus ED04 through the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic apparatus ED01, some (the display device ED60, etc.) of the components may be omitted, or other components may be added. Some of these components may be implemented in one integrated circuit. For example, the sensor module ED76 (a fingerprint sensor, an iris sensor, an illuminance sensor, etc.) may be implemented by being embedded in the display device ED76 (a display, etc.). In addition, when an image sensor 1000 includes a spectral function, some functions (color sensor or light sensor) of the sensor module may be implemented in the image sensor 1000, not in a separate sensor module.

The processor ED20 may execute software (a program ED40, etc.) to control one or more other components (hardware or software components, etc.) of the electronic apparatus ED01 connected to the processor ED20, and may perform a variety of data processing or operations. As a portion of the data processing or operations, the processor ED20 may load instructions and/or data received from other components (the sensor module ED76, the communication module ED90, etc.) into a volatile memory ED32, may process instructions and/or data stored in the volatile memory ED32, and may store result data in a nonvolatile memory ED34. The processor ED20 may include a main processor ED21 (a central processing unit, an application processor, etc.) and an auxiliary processor ED23 (a graphics processing unit, an image signal processor, a sensor hub processor, a communication processor, etc.) that may be operated independently or together. The auxiliary processor ED23 uses less power than the main processor ED21 and may perform specialized functions.

The auxiliary processor ED23 may control functions and/or states related to some (the display device ED60, the sensor module ED76, the communication module ED90, etc.) of the components of the electronic apparatus ED01 on behalf of the main processor ED21 while the main processor ED21 is in an inactive (e.g., sleep) state or with the main processor ED21 while the main processor ED21 is in an active (e.g., application execution) state. The auxiliary processor ED23 (an image signal processor, a communication processor, etc.) may be implemented as a portion of other functionally relevant components (the camera module ED80, the communication module ED90, etc.).

The memory ED30 may store a variety of data required by the components (the processor ED20, the sensor module ED76, etc.) of the electronic apparatus ED01. The data may include, for example, software (the program ED40, etc.) and input data and/or output data for commands related thereto. The memory ED30 may include the volatile memory ED32 and/or the nonvolatile memory ED34. The nonvolatile memory ED32 may include an internal memory ED36 fixed in the electronic apparatus ED01 and a removable external memory ED38.

The program ED40 may be stored as software in the memory ED30, and may include an operating system ED42, middleware ED44, and/or an application ED46.

The input device ED50 may receive commands and/or data to be used for the components (the processor ED20, etc.) of the electronic apparatus ED01 from the outside (a user, etc.) of the electronic apparatus ED01. The input device ED50 may include a microphone, mouse, keyboard, and/or digital pen (a stylus pen, etc.).

The audio output device ED55 may output an audio signal to the outside of the electronic apparatus ED01. The audio output device ED55 may include a speaker and/or a receiver. The speaker may be used for general purposes such as multimedia playback or recording playback, and the receiver may be used to receive incoming calls. The receiver may be combined as a portion of the speaker or may be implemented as a separate device.

The display device ED60 may visually provide information to the outside of the electronic apparatus ED01. The display device ED60 may include a display, a hologram device, or a projector, and a control circuit for controlling the devices. The display device ED60 may include touch circuitry set to sense a touch, and/or sensor circuitry (a pressure sensor, etc.) configured to measure the intensity of force generated by the touch.

The audio module ED70 may convert sound into an electrical signal, or vice versa. The audio module ED70 may obtain sound through the input device ED50, or may output sound through the audio output device ED55 and/or speakers and/or headphones of another electronic apparatus (the electronic apparatus ED02, etc.) directly or wirelessly connected to the electronic apparatus ED01.

The sensor module ED76 may detect an operating state (power, temperature, etc.) of the electronic apparatus ED01 or an external environmental state (user status, etc.), and may generate an electrical signal and/or a data value corresponding to the detected state. The sensor module ED76 may include a gesture sensor, a gyro sensor, a barometric sensor, a magnetic sensor, an acceleration sensor, a grip sensor, a proximity sensor, a color sensor, an infrared (IR) sensor, a biological sensor, a temperature sensor, a humidity sensor, and/or an illuminance sensor.

The interface ED77 may support one or more designated protocols, which may be used to directly or wirelessly connect the electronic apparatus ED01 with other electronic apparatuses (the electronic apparatus ED02, etc.). The interface ED77 may include a high definition multimedia interface (HDMI), a universal serial bus (USB) interface, a secure digital (SD) card interface, and/or an audio interface.

A connection terminal ED78 may include a connector through which the electronic apparatus ED01 may be physically connected to other electronic apparatuses (the electronic apparatus ED02, etc.). The connection terminal ED78 may include an HDMI connector, a USB connector, an SD card connector, and/or an audio connector (a headphone connector, etc.).

The haptic module ED79 may convert electrical signals into a mechanical stimulus (vibration, movement, etc.) or an electrical stimulus that a user may perceive through tactile or motor sensations. The haptic module ED79 may include a motor, a piezoelectric element, and/or an electrical stimulation device.

The camera module ED80 may capture a still image and a moving image. The camera module ED80 may include the image acquisition apparatus 1000 described above, and may include additional lens assembly image signal processors, and/or flashes. A lens assembly included in the camera module ED80 may collect light emitted from an object to be captured.

The power management module ED88 may manage power supplied to the electronic apparatus ED01. The power management module ED88 may be implemented as a portion of a power management integrated circuit PMIC.

The battery ED89 may supply power to components of the electronic apparatus ED01. The battery ED89 may include a non-rechargeable primary battery, a rechargeable secondary battery, and/or a fuel cell.

The communication module ED90 may support establishment of a direct (wired) communication channel and/or a wireless communication channel between the electronic apparatus ED01 and other electronic apparatuses (the electronic apparatus ED02, the electronic apparatus ED04, the server ED08, etc.), and communication through the established communication channel. The communication module ED90 operates independently of the processor ED20 (an application processor, etc.) and may include one or more communication processors supporting direct communication and/or wireless communication. The communication module ED90 may include a wireless communication module ED92 (a cellular communication module, a short-range wireless communication module, a global navigation satellite system (GNSS), etc.) and/or a wired communication module ED94 (a local area network (LAN) communication module, a power line communication module, etc.). A corresponding communication module from among these communication modules may communicate with other electronic apparatuses through the first network ED98 (a local area network such as Bluetooth, WiFi Direct, or Infrared Data Association (IrDA)) or the second network ED99 (a telecommunication network such as a cellular network, the Internet, or computer networks (LAN, WAN, etc.)). These various types of communication modules may be integrated into a single component (a single chip, etc.) or may be implemented as a plurality of separate components (multiple chips). The wireless communication module ED92 may identify and authenticate the electronic apparatus ED01 within a communication network such as the first network ED98 and/or the second network ED99 using subscriber information (an international mobile subscriber identifier (IMSI), etc.) stored in the subscriber identity module ED96.

The antenna module ED97 may transmit and/or receive signals and/or power to and/or from the outside (other electronic apparatuses, etc.). An antenna may include a radiator made of a conductive pattern formed on a substrate (a PCB, etc.). The antenna module ED97 may include one or more antennas. When a plurality of antennas are included, the communication module ED90 may select an antenna suitable for a communication method used in a communication network, such as the first network ED98 and/or the second network ED99, among the plurality of antennas. Signals and/or power may be transmitted or received between the communication module ED90 and other electronic apparatuses through the selected antenna. Other components (an RFIC, etc.) besides the antenna may be included as a portion of the antenna module ED97.

Some of the components may be connected to each other and exchange signals (command, data, etc.) through a communication method between peripheral devices (a bus, general purpose input and output (GPIO), a serial peripheral interface (SPI), a mobile industry processor interface (MIPI), etc.).

Commands or data may be transmitted or received between the electronic apparatus ED01 and the electronic apparatus ED04, an external apparatus, through the server ED08 connected to the second network ED99. The other electronic apparatuses ED02 and ED04 may be the same as or different from the electronic apparatus ED01. All or some of the operations executed by the electronic apparatus ED01 may be executed by one or more of the other electronic apparatuses ED02, ED04, and ED08. For example, when the electronic apparatus ED01 needs to perform certain functions or services, the electronic apparatus ED01 may request one or more other electronic apparatuses to perform some or all of the functions or services instead of directly executing the functions or services. One or more other electronic apparatuses that have received the request may execute an additional function or service related to the request, and may transfer a result of the execution to the electronic apparatus ED01. To this end, cloud computing, distributed computing, and/or client-server computing technologies may be used.

Figure 13:
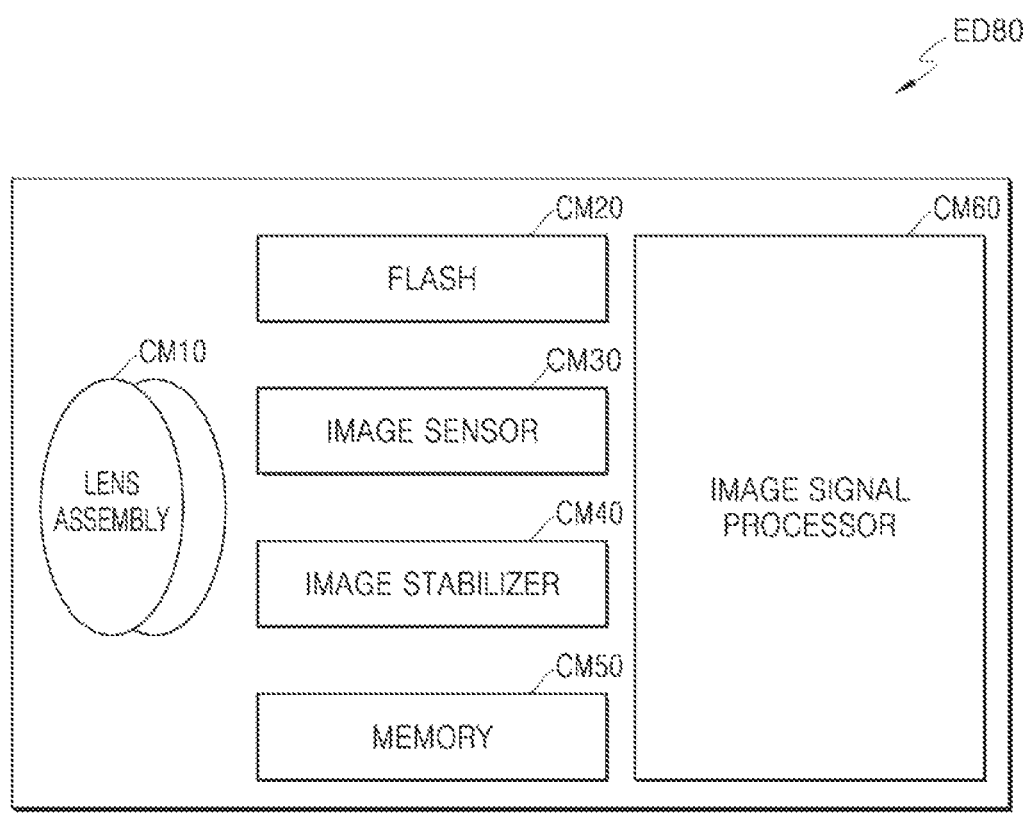
FIG. 13 is a block diagram of a camera module provided in the electronic apparatus of FIG. 12.

FIG. 13 is a block diagram of the camera module ED80 included in the electronic apparatus of FIG. 12. The camera module ED80 may include the image acquisition apparatus 1000 described above, or may have a structure modified therefrom. Referring to FIG. 13, the camera module ED80 may include a lens assembly CM10, a flash CM20, an image sensor CM30, an image stabilizer CM40, a memory CM50 (a buffer memory, etc.), and/or an image signal processor CM60.

The image sensor CM30 may include the first image sensor 100 and the second image sensor 200 provided in the image acquisition apparatus 1000 described above. The first image sensor 100 and the second image sensor 200 may obtain an image corresponding to an object by converting light emitted or reflected from the object and transferred through the lens assembly CM10 into an electrical signal. The first image sensor 100 may obtain an RGB image, and the second image sensor 200 may obtain a hyperspectral image of an ultraviolet to infrared wavelength range.

In addition to the first image sensor 100 and the second image sensor 200 described above, the image sensor CM30 may further include one or more sensors selected from image sensors having different properties, such as another RGB sensor, a black and white (BW) sensor, an IR sensor, or a UV sensor. Each of the sensors included in the image sensor CM30 may be implemented as a CCD sensor and/or a CMOS sensor.

The lens assembly CM10 may collect light emitted from an object to be captured. The camera module ED80 may include a plurality of lens assemblies CM10, and in this case, may be a dual camera, a 360-degree camera, or a spherical camera. Some of the plurality of lens assemblies CM10 may have the same lens properties (field of view, focal length, autofocus, F Number, optical zoom, etc.) or different lens properties. The lens assembly CM10 may include a wide-angle lens or a telephoto lens.

The lens assembly CM10 may be configured such that two image sensors included in the image sensor CM30 form an optical image of an object at the same position and/or focus may be controlled.

The flash CM20 may emit light used to enhance light emitted or reflected from an object. The flash CM20 may include one or more light emitting diodes (red-green-blue (RGB) LED, white LED, infrared LED, ultraviolet LED, etc.), and/or a xenon lamp.

The image stabilizer CM40 may move one or more lenses or the image sensor 1000 included in the lens assembly CM10 in a specific direction in response to movement of the camera module ED80 or an electronic apparatus CM01 including the same, or may control an operating characteristic of the image sensor 1000 (adjustment of read-out timing, etc.) such that a negative effect due to movement is compensated for. The image stabilizer CM40 may detect movement of the camera module ED80 or the electronic apparatus ED01 using a gyro sensor (not shown) or an acceleration sensor (not shown) arranged inside or outside the camera module ED80. The image stabilizer CM40 may be implemented optically.

In the memory CM50, some or all of data obtained through the image sensor 1000 may be stored for the next image processing operation. For example, when a plurality of images are obtained at a high speed, the obtained original data (Bayer-patterned data, high-resolution data, etc.) may be stored in the memory CM50 and only a low-resolution image is displayed, and then the original data of a selected image (user selection, etc.) may be transferred to the image signal processor CM60. The memory CM50 may be integrated into the memory ED30 of the electronic apparatus ED01 or may be configured as a separate memory that is independently operated.

The image signal processor CM60 may perform one or more image processes on an image obtained through the image sensor CM30 or image data stored in the memory CM50. As described with reference to FIGS. 1 to 10, a first image (e.g., an RGB image) and a second image (e.g., an MSI image) obtained by two image sensors included in the image sensor CM30 are processed to generate a third image on which white balance is performed. A configuration of the processor 500 for this purpose may be included in the image signal processor CM60.

The one or more image processes may include, in addition, depth map generation, three-dimensional modeling, panorama generation, feature point extraction, image synthesis, and/or image compensation (noise reduction, resolution adjustment, brightness adjustment, blurring, sharpening, softening, etc.). The image signal processor CM60 may control (exposure time control, read-out timing control, etc.) components (the image sensor CM30, etc.) included in the camera module CM80. An image processed by the image signal processor CM60 may be stored again in the memory CM50 for further processing or may be provided to external components (the memory ED30, the display device ED60, the electronic apparatus ED02, the electronic apparatus ED04, the server ED08, etc.) of the camera module ED80. The image signal processor CM60 may be integrated into the processor CM20 or may be configured as a separate processor that operates independently of the processor CM20. When the image signal processor CM60 is configured as a separate processor from the processor ED20, an image processed by the image signal processor CM60 may be displayed through the display device ED60 after further image processing by the processor ED20.

The electronic apparatus ED01 may include a plurality of camera modules ED80 having respective attributes or functions. In this case, one of the plurality of camera modules ED80 may be a wide-angle camera, and the other may be a telephoto camera. Similarly, one of the plurality of camera modules ED80 may be a front camera, and the other may be a rear camera.

FIGS. 14 to 23 are views illustrating various examples of an electronic apparatus to which an image acquisition apparatus according to an example embodiment is applied.

Figure 14:
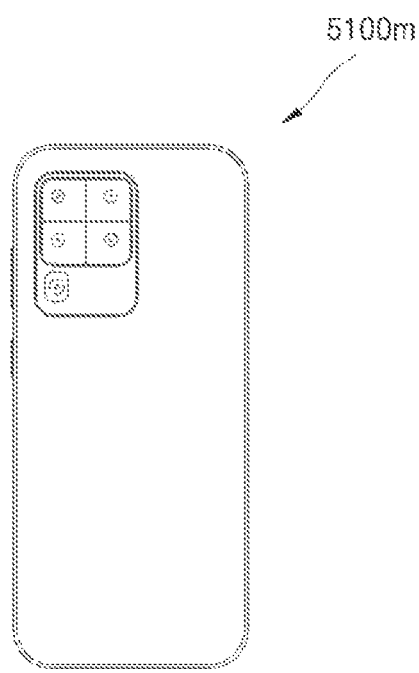
FIGS. 14, 15, 16, 17, 18, 19, 20, 21, 22, and 23 are views illustrating various examples of an electronic apparatus to which an image acquisition apparatus according to an example embodiment is applied.
Figure 15:
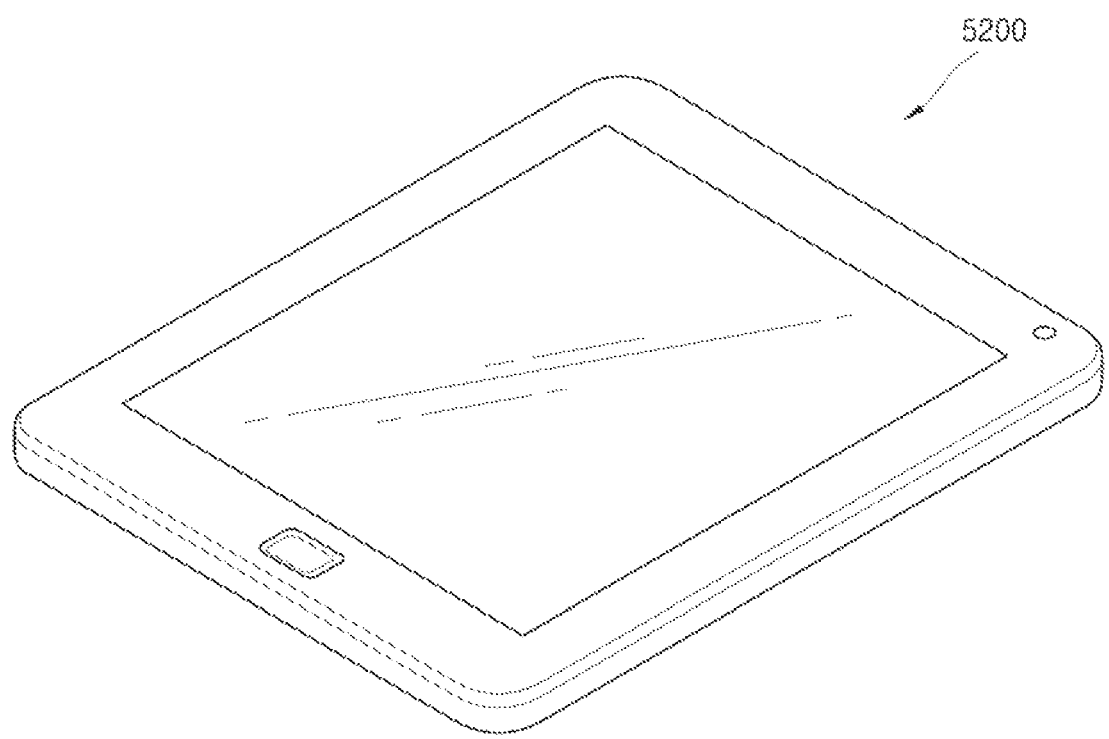
Figure 16:
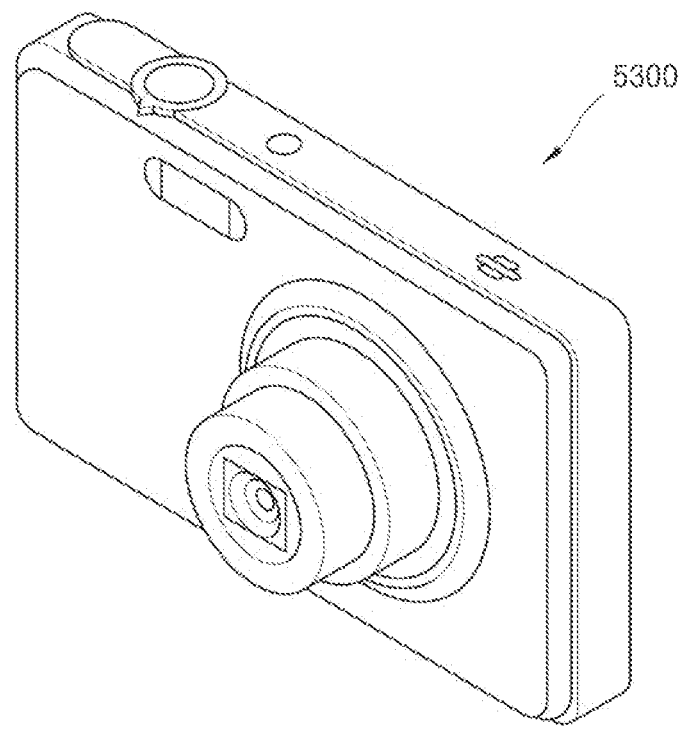
Figure 17:
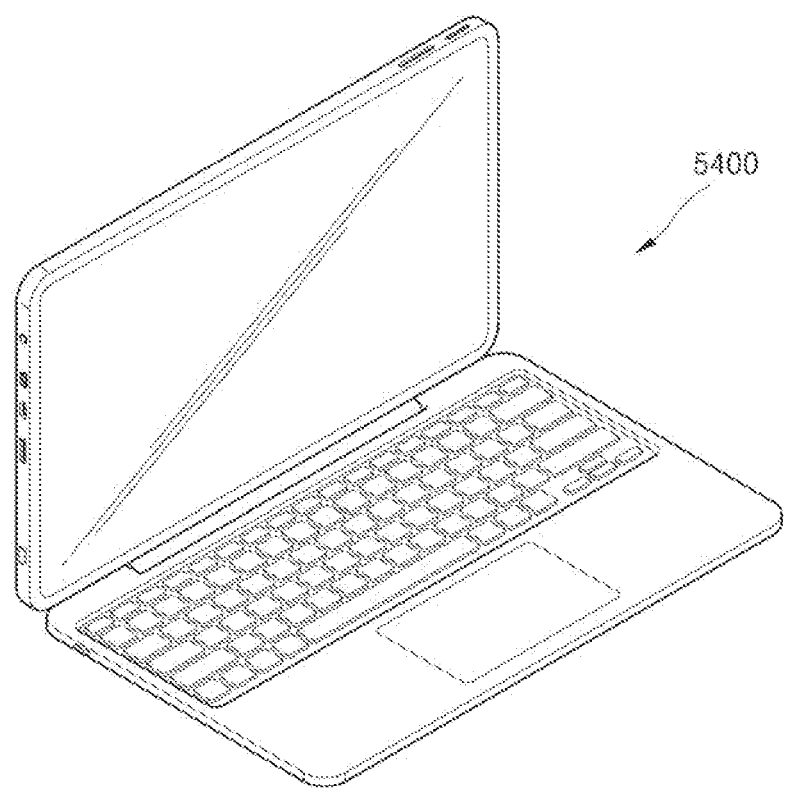
Figure 18:
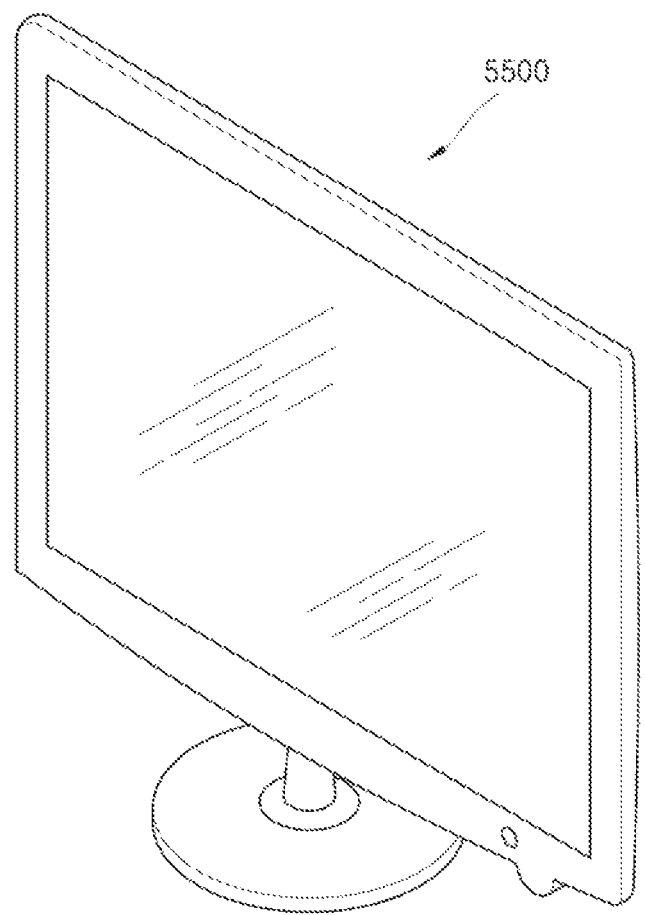
Figure 19:
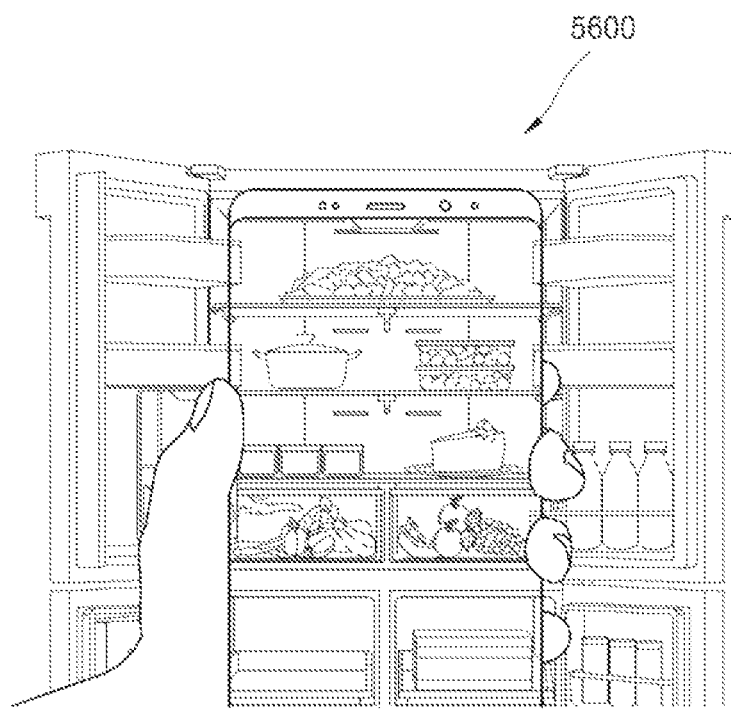

An image acquisition apparatus according to example embodiments may be applied to a mobile phone or smartphone 5100m shown in FIG. 14, a tablet or smart tablet 5200 shown in FIG. 15, a digital camera or camcorder 5300 shown in FIG. 16, a laptop computer 5400 shown in FIG. 17, or a television or smart television 5500 shown in FIG. 19. For example, the smartphone 5100m or the smart tablet 5200 may include a plurality of high-resolution cameras each having a high-resolution image sensor mounted thereon. High-resolution cameras may be used to extract depth information of objects in an image, adjust out focusing of an image, or automatically identify objects in an image.

Figure 20:
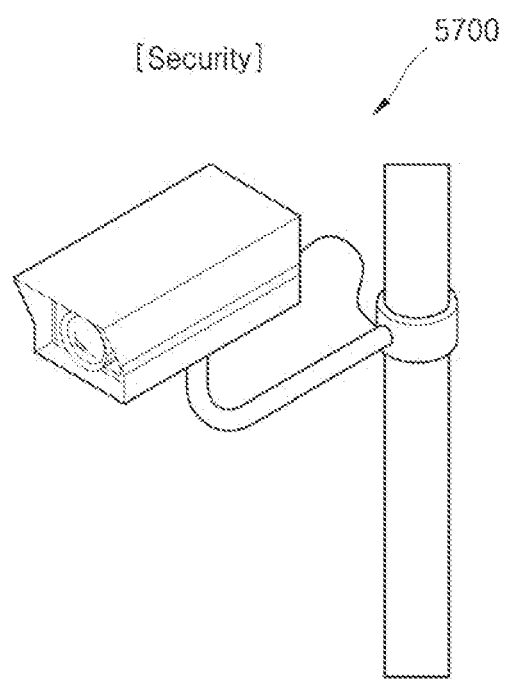
Figure 21:
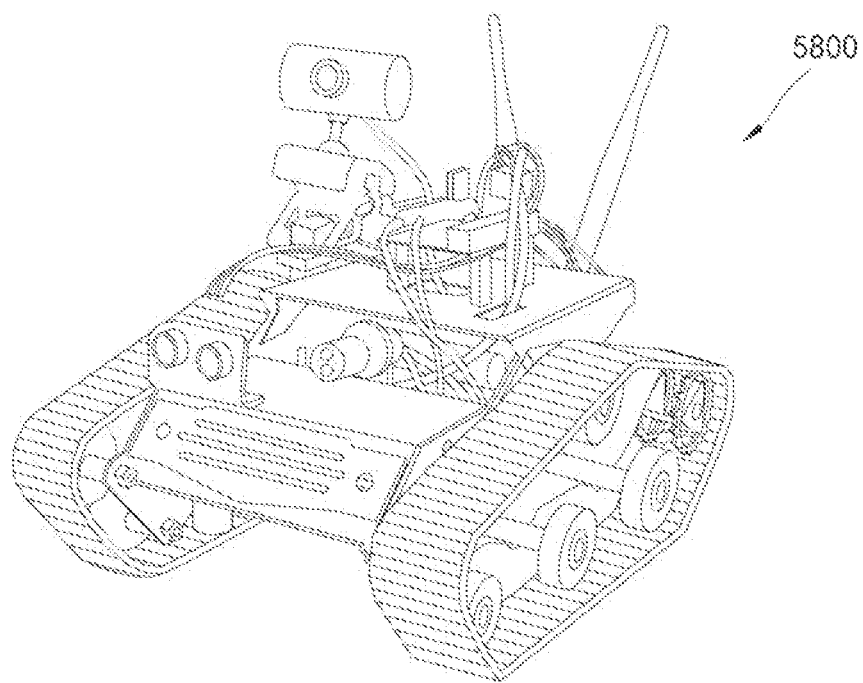
Figure 22:
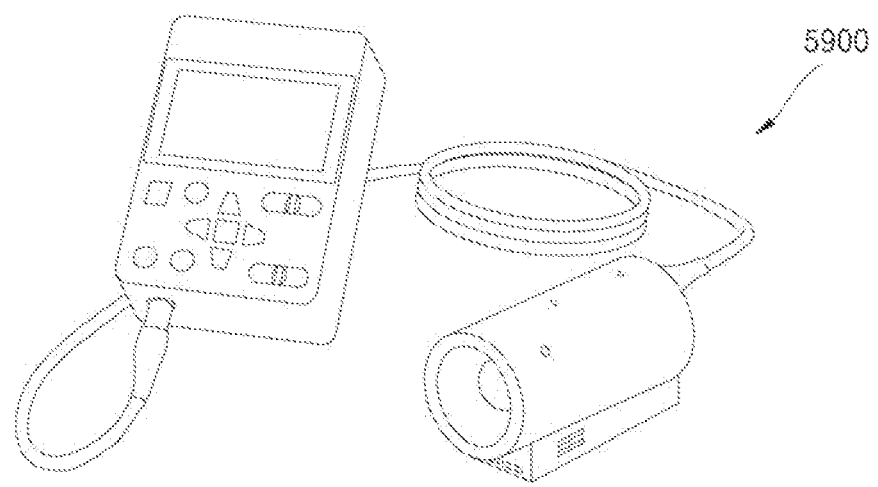

In addition, the image acquisition apparatus 1000 may be applied to a smart refrigerator 5600 shown in FIG. 19, a security camera 5700 shown in FIG. 20, a robot 5800 shown in FIG. 21, a medical camera 5900 shown in FIG. 22, and the like. For example, the smart refrigerator 5600 may automatically recognize food in a refrigerator using the image acquisition apparatus 1000, and may inform a user of the presence of specific food, the type of food received or shipped, and the like through a smartphone. The security camera 5700 may provide an ultra-high-resolution image and may recognize an object or a person in an image even in a dark environment by using high sensitivity. The robot 5800 may provide a high-resolution image by being input at a disaster or industrial site that cannot be directly accessed by humans. The medical camera 5900 may provide a high-resolution image for diagnosis or surgery, and may dynamically adjust a field of view.

Figure 23:
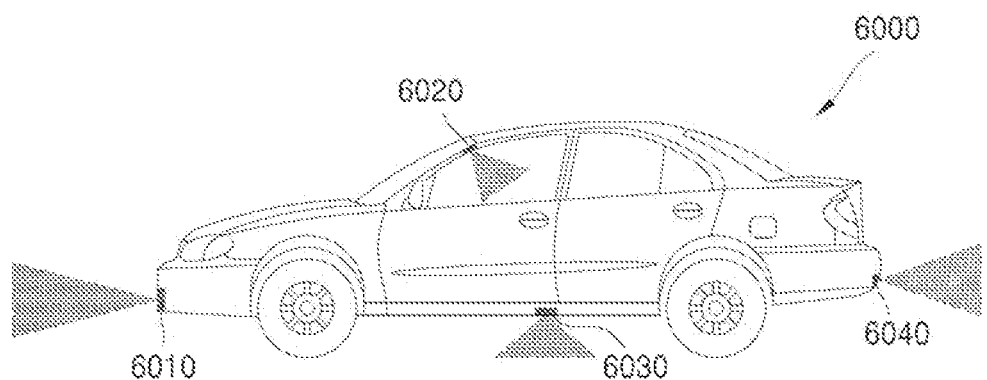

In addition, the image acquisition apparatus 1000 may be applied to a vehicle 6000 as shown in FIG. 23. The vehicle 6000 may include a plurality of vehicle cameras 6010, 6020, 6030, and 6040 arranged in various positions. Each of the vehicle cameras 6010, 6020, 6030, and 6040 may include an image acquisition apparatus according to an example embodiment. The vehicle 6000 may use a plurality of vehicle cameras 6010, 6020, 6030, and 6040 to provide a driver with various information about the interior or surroundings of the vehicle 6000, and may provide information necessary for autonomous driving by automatically recognizing objects or people in an image.

An image acquisition apparatus according to an example embodiment may more accurately estimate illumination in various situations and more accurately perform white balance to maintain color homeostasis.

The above-described image acquisition apparatus may be employed in various electronic apparatuses.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An image acquisition apparatus comprising:
an image sensor; and
a processor,
wherein the image sensor comprises:
a first image sensor configured to obtain a first image; and
a second image sensor configured to obtain a second image,
wherein the first image sensor comprises:
a first sensor layer in which a plurality of first sensing elements are provided; and
a first pixel array having a color filter provided on the first sensor layer and including red filters, green filters, and blue filters that are alternately provided,
wherein the second image sensor comprises:
a second sensor layer in which a plurality of second sensing elements are provided; and
a second pixel array having a spectral filter in which a filter group comprising a plurality of unit filters having different transmission wavelength bands is repeatedly provided, the spectral filter being provided on the second sensor layer, and
wherein the processor is configured to:
obtain an image by matching the first image and the second image;
obtain a basis based on a surrounding environment in which the image acquisition apparatus is provided;
estimate illumination information by performing spectral decomposition on the second image, obtained by the second image sensor, using the obtained basis; and
perform color conversion on the image, obtained by matching the first image and the second image, based on the estimated illumination information.

2. The image acquisition apparatus of claim 1, further comprising at least one sensor configured to sense environmental information of the surrounding environment,
wherein the processor is further configured to select the basis from a plurality of pre-stored basis sets based on the environmental information obtained from the at least one sensor.

3. The image acquisition apparatus of claim 2, wherein the processor periodically or aperiodically is configured to obtain the environmental information by the at least one sensor prior to obtaining an image by the image sensor.

4. The image acquisition apparatus of claim 2, wherein the at least one sensor comprises a global positioning system (GPS) sensor, an inertial measurement unit (IMU) sensor, a barometer, a magnetometer, an illuminance sensor, a proximity sensor, a distance sensor, or a three-dimensional scanner.

5. The image acquisition apparatus of claim 2, wherein the processor is further configured to:
analyze at least one of the first image obtained by the first image sensor or the second image obtained by the second image sensor;
extract the environmental information from the analyzed image; and
select the basis from the plurality of pre-stored basis sets based on the extracted environmental information.

6. The image acquisition apparatus of claim 2, further comprising a storage configured to store the plurality of pre-stored basis sets, each basis set including illumination and reflectance based on a wavelength,
wherein the processor is further configured to select a basis set corresponding to the obtained environmental information from among the plurality of pre-stored basis sets.

7. The image acquisition apparatus of claim 6, wherein the processor is further configured to estimate the illumination information by performing spectral decomposition on the second image based on the selected basis set.

8. The image acquisition apparatus of claim 1, wherein the image sensor is further configured to sense images of multiple wavelength bands.

9. The image acquisition apparatus of claim 1, wherein each of the different transmission wavelength bands of the plurality of unit filters comprises visible light and is included in a wavelength band greater than a visible light band, and
wherein the filter group comprises 16 unit filters provided in a 4×4 array.

10. The image acquisition apparatus of claim 1, wherein the first pixel array and the second pixel array are horizontally spaced apart from each other on a circuit board.

11. The image acquisition apparatus of claim 10, wherein first circuit elements configured to process a signal from the first sensor layer and second circuit elements configured to process a signal from the second sensor layer are provided on the circuit board.

12. The image acquisition apparatus of claim 11, further comprising a timing controller configured to synchronize operations of the first circuit elements and the second circuit elements.

13. The image acquisition apparatus of claim 10, further comprising:
a first memory configured to store data corresponding to the first image; and
a second memory configured to store data corresponding to the second image.

14. The image acquisition apparatus of claim 13, wherein the first memory and the second memory are provided in the circuit board.

15. The image acquisition apparatus of claim 1, further comprising:
a first imaging optical system configured to form an optical image of an object on the first image sensor and comprising one or more lenses; and
a second imaging optical system configured to form an optical image of the object on the second image sensor and comprising one or more lenses.

16. The image acquisition apparatus of claim 15, wherein the first imaging optical system and the second imaging optical system have identical focal lengths and identical fields of views.

17. The image acquisition apparatus of claim 1, wherein the basis is a data set used to estimate the illumination information.

18. An electronic apparatus including an image acquisition apparatus, the image acquisition apparatus comprising:
an image sensor; and
a processor,
wherein the image sensor comprises:
a first image sensor configured to obtain a first image; and
a second image sensor configured to obtain a second image,
wherein the first image sensor comprises:
a first sensor layer in which a plurality of first sensing elements are provided; and
a first pixel array having a color filter provided on the first sensor layer and including red filters, green filters, and blue filters that are alternately provided, wherein the second image sensor comprises:
a second sensor layer in which a plurality of second sensing elements are provided; and
a second pixel array having a spectral filter in which a filter group comprising a plurality of unit filters having different transmission wavelength bands is repeatedly provided, the spectral filter being provided on the second sensor layer, and wherein the processor is configured to:
obtain an image by matching the first image and the second image;
obtain a basis based on a surrounding environment in which the image acquisition apparatus is provided;
estimate illumination information by performing spectral decomposition on the second image, obtained by the second image sensor, using the obtained basis; and
perform color conversion on the image, obtained by matching the first image and the second image, based on the estimated illumination information.

19. A control method of an image acquisition apparatus, the method comprising:
obtaining a first image captured by a first image sensor which comprises a first sensor layer in which a plurality of first sensing elements are provided and a first pixel array having a color filter provided on the first sensor layer and including red filters, green filters, and blue filters that are alternately provided;
obtaining a second image captured by a second image sensor which comprises a second sensor layer in which a plurality of second sensing elements are provided and a second pixel array having a spectral filter in which a filter group comprising a plurality of unit filters having different transmission wavelength bands is repeatedly provided, the spectral filter being provided on the second sensor layer;
obtaining an image by matching the first image and the second image;
obtaining a basis based on a surrounding environment, in which the image acquisition apparatus is provided, from the second image;
estimating illumination information by performing spectral decomposition on the second image, captured by the second image sensor, using the obtained basis; and
performing color conversion on the image, obtained by matching the first image and the second image, based on the estimated illumination information.

* * * * *